(12) United States Patent
Maezawa

(10) Patent No.: US 11,217,034 B2
(45) Date of Patent: *Jan. 4, 2022

(54) SIZE MEASUREMENT DEVICE, MANAGEMENT SERVER, USER TERMINAL AND SIZE MEASUREMENT SYSTEM

(71) Applicant: ZOZO, INC., Chiba (JP)

(72) Inventor: Yusaku Maezawa, Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/489,973

(22) PCT Filed: Feb. 9, 2018

(86) PCT No.: PCT/JP2018/004684
§ 371 (c)(1),
(2) Date: Aug. 29, 2019

(87) PCT Pub. No.: WO2018/159271
PCT Pub. Date: Sep. 7, 2018

(65) Prior Publication Data
US 2020/0013234 A1 Jan. 9, 2020

(30) Foreign Application Priority Data

Mar. 1, 2017 (JP) .............................. JP2017-038102

(51) Int. Cl.
*G06T 19/20* (2011.01)
*G01B 7/28* (2006.01)
(Continued)

(52) U.S. Cl.
CPC ................ *G06T 19/20* (2013.01); *G01B 7/28* (2013.01); *G06Q 30/0641* (2013.01); *H04L 67/02* (2013.01); *G06T 2219/012* (2013.01)

(58) Field of Classification Search
None
See application file for complete search history.

(56) References Cited

U.S. PATENT DOCUMENTS

| 4,715,235 A | * | 12/1987 | Fukui | ..................... | D04B 1/14 |
| | | | | | 73/862.68 |
| 2010/0168560 A1 | * | 7/2010 | Hauck | .................. | A61M 25/00 |
| | | | | | 600/424 |

(Continued)

FOREIGN PATENT DOCUMENTS

| CN | 106413452 A | 2/2017 |
| EP | 3148359 A1 | 4/2017 |

(Continued)

OTHER PUBLICATIONS

International Search Report issued in PCT/JP2018/004684 dated Apr. 24, 2018 (including English translation) (3 pages).

*Primary Examiner* — Sultana M Zalalee
(74) *Attorney, Agent, or Firm* — FisherBroyles, LLP; Rob L. Phillips

(57) ABSTRACT

[Subject] To provide a size measuring device that can be readily handled and easily used for a size-taking process by even a user who has no specialized size-taking technique, a managing server, a user terminal and a size measuring system.

[Means to Solve Problems] The size measuring system is provided with a size measuring device 10 that is attached to a user's body so as to measure the size of the user's body, and outputs sensor measurement information indicating the measured size or the like, a user terminal 20 operated by the user who measures the body and a managing server 30 that manages information or the like of the size and shape of apparel commodities, and based upon the sensor measurement information, supplies user size information corresponding to the information of the body size of the user and commodity retrieval results information corresponding to information about commodities that fit to the size to the user terminal 20.

15 Claims, 29 Drawing Sheets

(51) Int. Cl.
*G06Q 30/06* (2012.01)
*H04L 29/08* (2006.01)

(56) References Cited

U.S. PATENT DOCUMENTS

| | | | | |
|---|---|---|---|---|
| 2013/0066168 | A1* | 3/2013 | Yang | A61B 5/01 |
| | | | | 600/301 |
| 2013/0250050 | A1* | 9/2013 | Kanaujia | H04N 13/106 |
| | | | | 348/42 |
| 2014/0070957 | A1* | 3/2014 | Longinotti-Buitoni | |
| | | | | G06F 3/011 |
| | | | | 340/870.01 |
| 2014/0072170 | A1* | 3/2014 | Zhang | G06K 9/00369 |
| | | | | 382/103 |
| 2014/0192050 | A1* | 7/2014 | Qiu | G06K 9/00214 |
| | | | | 345/420 |
| 2014/0225888 | A1* | 8/2014 | Bell | G06T 19/00 |
| | | | | 345/419 |
| 2015/0309563 | A1* | 10/2015 | Connor | G06F 3/017 |
| | | | | 73/865.4 |
| 2015/0342266 | A1 | 12/2015 | Cooper et al. | |
| 2016/0155186 | A1* | 6/2016 | Su | G06F 16/532 |
| | | | | 705/27.2 |
| 2016/0213548 | A1* | 7/2016 | John | A61H 1/0244 |
| 2016/0238468 | A1* | 8/2016 | Dunne | G01L 1/2287 |
| 2016/0247017 | A1* | 8/2016 | Sareen | G06T 19/00 |
| 2017/0032444 | A1* | 2/2017 | Cooper | A41B 11/00 |
| 2017/0066092 | A1* | 3/2017 | Yamamoto | G05B 19/41805 |
| 2017/0082418 | A1* | 3/2017 | Gong | A61B 5/1072 |
| 2017/0196513 | A1* | 7/2017 | Longinotti-Buitoni | |
| | | | | A61B 5/743 |
| 2017/0245570 | A1* | 8/2017 | Yuen | A42C 3/06 |
| 2017/0249491 | A1* | 8/2017 | MacIntosh | G06K 9/4604 |
| 2018/0075648 | A1* | 3/2018 | Moghadam | G06T 17/05 |
| 2018/0374383 | A1* | 12/2018 | Thielen | G06T 19/20 |
| 2019/0353533 | A1* | 11/2019 | Marchesi | D04B 1/14 |
| 2020/0060371 | A1* | 2/2020 | Maezawa | G01B 7/02 |

FOREIGN PATENT DOCUMENTS

| | | | | |
|---|---|---|---|---|
| JP | 3127490 | U | 2/1990 | |
| JP | 2016153729 | A * | 8/2016 | |
| JP | 2017-519120 | A | 3/2017 | |
| WO | WO-2013188908 | A1 * | 12/2013 | A41H 1/02 |
| WO | WO-2015125455 | A1 * | 8/2015 | G06Q 30/06 |
| WO | 2015/181661 | A1 | 12/2015 | |

* cited by examiner

Fig. 4
(a)
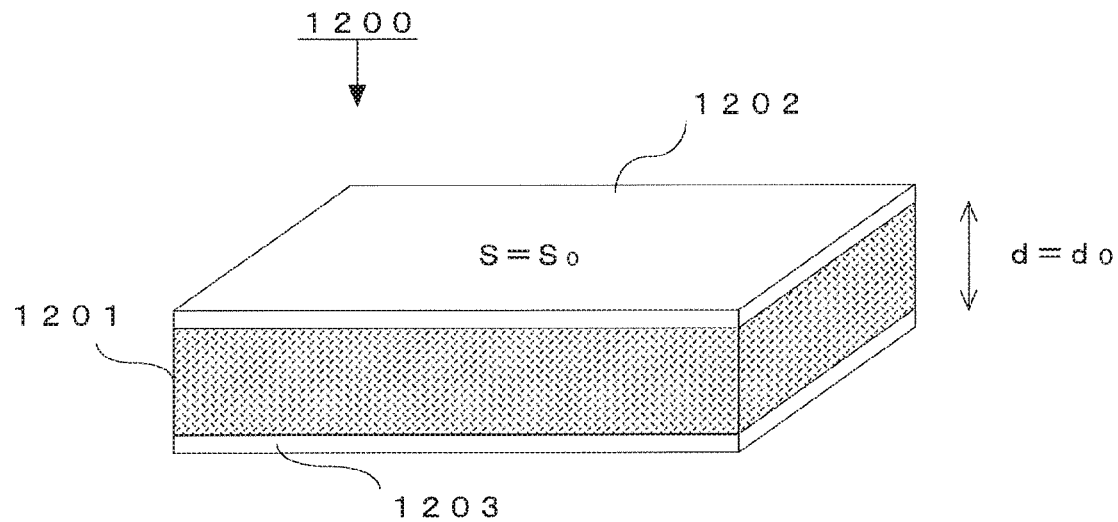
(b)
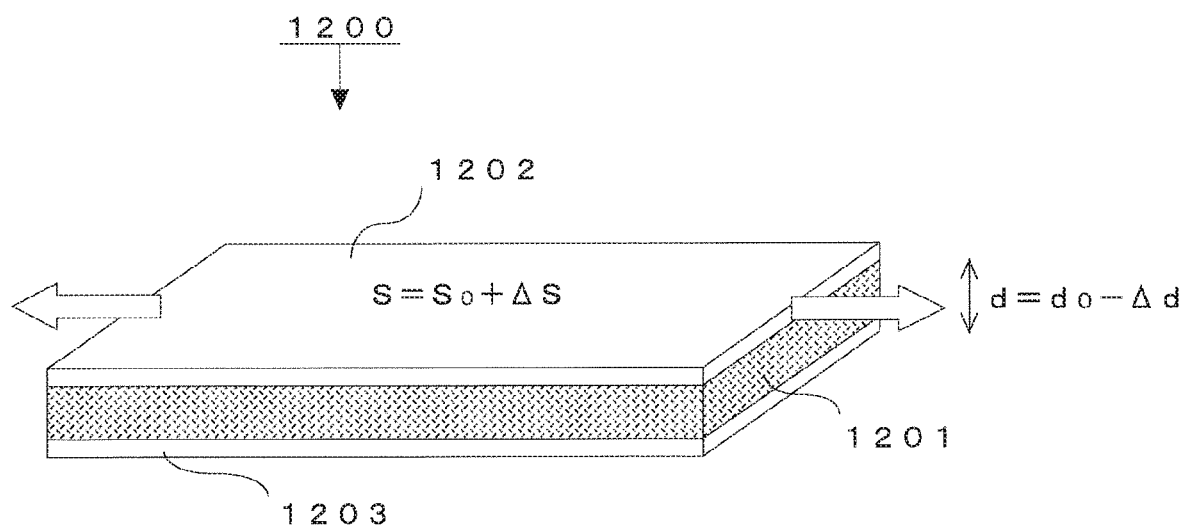

Fig. 9

USER MEASUREMENT DB 325

| USER ID | L1 | L2 | L3 | L4 | ... |
|---|---|---|---|---|---|
| 0001 | 78.0 | 86.9 | 56.3 | 56.1 | ... |
| 0002 | 68.2 | 83.3 | 52.0 | 51.6 | ... |
| 0003 | 85.9 | 98.2 | 69.2 | 67.9 | ... |
| 0004 | 75.6 | 85.2 | 55.3 | 55.2 | ... |
| ... | ... | ... | ... | ... | ... |

Fig. 10

COMMODITY DB 326

| COMMODITY ID | KINDS | COLOR | MAKER | PRICE | URL | COMMODITY SIZE INFORMATION | ... |
|---|---|---|---|---|---|---|---|
| S0001 | COTTON PANTS | BEIGE | COMPANY A | 6,800 | ... | ... | ... |
| S0002 | COTTON PANTS | GRAY | COMPANY A | 8,800 | ... | ... | ... |
| S0003 | DENIMS | DENIMS | COMPANY A | 12,500 | ... | ... | ... |
| S0004 | SWEAT SHIRT | GRAY | COMPANY B | 4,800 | ... | ... | ... |
| ... | ... | ... | ... | ... | ... | ... | ... |

Fig. 11

COMMODITY DB 326 (SIZE INFORMATION)

| COMMODITY ID | L1 | L2 | L3 | L4 | ... |
|---|---|---|---|---|---|
| S0001 | 72.0 (70.0~75.0) | 84.0 (82.0~86.0) | 48.0 (44.0~54.0) | 48.0 (44.0~54.0) | ... |
| S0002 | 77.0 (75.0~80.0) | 90.0 (89.0~91.0) | 52.0 (53.0~56.0) | 52.0 (53.0~56.0) | ... |
| S0003 | 82.0 (80.0~86.0) | 96.0 (94.0~101.0) | 56.0 (54.0~59.0) | 56.0 (54.0~59.0) | ... |
| S0004 | 88.0 (86.0~94.0) | 104.0 (102.0~110.0) | 62.0 (58.0~65.0) | 62.0 (58.0~65.0) | ... |
| ... | ... | ... | ... | ... | ... |

Fig. 12

BODY TYPE IMAGE DB 327

| BODY TYPE ID | L1/L2 | L1/L3 | L1/L4 | ... |
|---|---|---|---|---|
| B001 | 0.85~0.88 | 1.3~1.6 | 1.3~1.7 | ... |
| B002 | 0.88~0.91 | 1.3~1.6 | 1.3~1.6 | ... |
| B003 | 0.91~0.93 | 1.4~1.8 | 1.4~1.8 | ... |
| B004 | 0.93~0.98 | 1.4~1.8 | 1.4~1.8 | ... |
| ... | ... | ... | ... | ... |

Fig. 13

COMMODITY IMAGE DB 328

| BODY TYPE ID | COMMODITY IMAGE ID | | | | |
|---|---|---|---|---|---|
| | S0001 (COMMODITY ID) | S0002 (COMMODITY ID) | S0003 (COMMODITY ID) | | ... |
| B001 | SI00011 | SI00021 | SI00031 | | ... |
| B002 | SI00012 | SI00022 | SI00032 | | ... |
| B003 | SI00013 | SI00023 | SI00033 | | ... |
| B004 | SI00014 | SI00024 | SI00034 | | ... |
| ... | ... | ... | ... | | ... |

Fig. 25
(a)
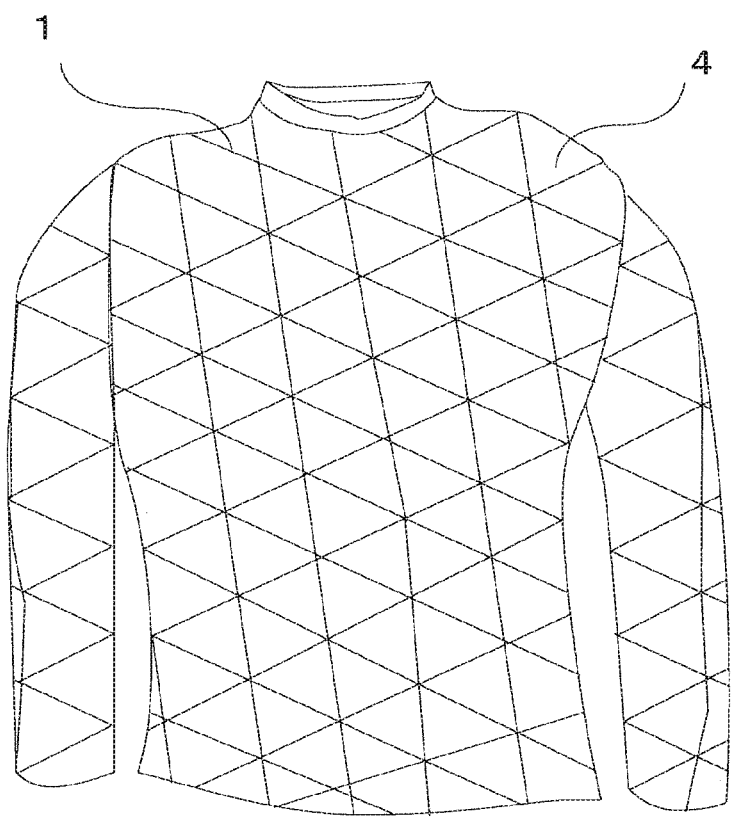
(b)
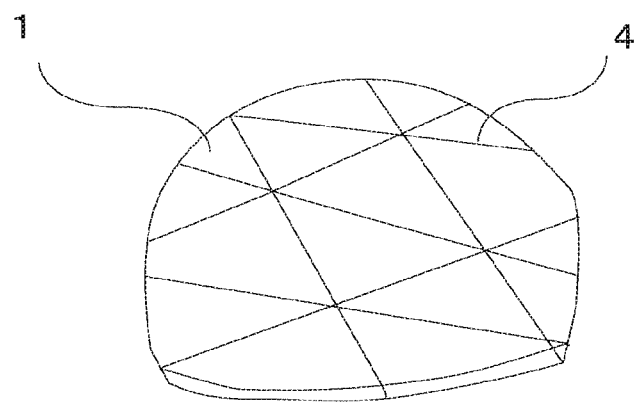

US 11,217,034 B2

SIZE MEASUREMENT DEVICE, MANAGEMENT SERVER, USER TERMINAL AND SIZE MEASUREMENT SYSTEM

CROSS-REFERENCE TO RELATED APPLICATIONS

The present invention is filed under 35 U.S.C. § 371 as the U.S. national phase of International Patent Application No. PCT/JP2018/004684, filed Feb. 9, 2018, which designated the United States and which claims priority to Japanese Patent Application No. 2017-038102, filed Mar. 1, 2017, each of which is hereby incorporated in its entirety including all tables, figures, and claims.

TECHNICAL FIELD

The present invention relates to a size measuring device, a managing server, a user terminal and a size measuring system, and in particular concerns such a size measuring device that is attached to a body of a user or another article, and measures a size or the like of the attached portion, as well as a managing server, a user terminal and a size measuring system thereof.

PRIOR ART

In daily life, when a user tries to purchase a commodity or receive any kind of service, the user sometimes needs to provide a size of the user's body or article. For example, when a user purchases an apparel commodity, such as clothes, a hat or the like, the user has to buy the apparel commodity based upon rather a rough standard, such as SML, of size information of his or her body; however, the corresponding apparel commodity has actually a different size even it has the same size description (SML or the like) depending on sales brands and makers in most cases, and the user needs to correctly confirm his or her size.

As one of the above-mentioned prior art for confirming the size of a body or an article, Patent Document 1 has proposed a body measuring measure.

The body measuring measure disclosed by Patent Document 1 is designed such that a zero-scale reference plate is fixed onto one end having a zero-scale of a freely bendable measuring tape, with a scale reading plate being attached to the middle portion of the measuring tape so as to be freely slidable relative to the measuring tape, a scale display part for displaying scale divisions and figures is installed in the center portion of the scale reading plate, a scale reading reference line is formed on the scale display part, and the measuring tape is made freely slidable on the rear surface of the scale display part through passage holes formed on the right and left sides of the scale display part, and in this structure, surface fasteners are attached to respectively predetermined portions on the surface of the zero-scale reference plate and the rear surface of the scale reading plate; thus, the positional relationship of the two members is set so that when both of the zero-scale reference plate and the scale reading plate are position-determined and overlapped with each other, the zero-scale on the zero-scale reference plate and the scale reading reference line of the scale reading plate are made coincident with each other.

By using the body measuring measure disclosed in Patent Document 1, in a state where the measuring tape is removed from a body portion such as a waist or the like, the size of a body portion such as a waist and breasts can be easily measured reliably and precisely.

PRIOR ART DOCUMENTS

[Patent Documents]
[Patent Document 1] Utility Model Registration No. 3127490

SUMMARY OF THE INVENTION

Problems to be Solved by the Invention

However, in the case when the above-mentioned body measuring measure of Patent Document 1 is used, although its measuring process becomes easier in comparison with a normal measuring process, deviations tend to occur in the measured value depending on persons who carry out a measurement, with the result that a problem might be caused in preciseness in the measured body size.

The present invention has been devised to solve the above-mentioned problems and its object is to provide a size measuring device that can be easily handled even by a user having no specialized size-taking technique, and enables to easily carry out a size-taking process, as well as a managing server, a user terminal and a size measuring system.
[Means for Solving Problems]

In order to achieve such an object, the present invention relates to a size measuring device which, when attached to a user, specifies a size and shape of an attached body portion of the user, and is provided with a main body part constituted by an expandable material and a measuring sensor for measuring a physical numeric value based upon a change in an electrical characteristic, and this structure is characterized in that the measuring sensors measure the degree of expansion of a base member caused by the shape of the body of the user, and are disposed on the main body part in a polygonal pattern.

Moreover, the size measuring device relating to the present invention is further provided with a detection part that detects a value in electrical characteristics outputted from the measuring sensor, and is characterized in that based upon an electric signal outputted from the measuring sensor, the detection part detects a value of the electrical characteristics of the measuring sensor.

Moreover, the size measuring device relating to the present invention is characterized in that the measuring sensors have a belt shape, and nodes corresponding to two ends in a belt length direction are shared between the plural measuring sensors adjacent to each other.

Moreover, in accordance with the size measuring device relating to the present invention, the measuring sensor, which is provided with a pair of plate-shaped electrodes and a dielectric film disposed between the paired electrodes, is characterized in that when a tension is applied to the electrodes so as to be expanded, it specifies the degree of expansion of the electrodes caused by the shape of a user's body based upon a change in the electrostatic capacitance caused by the expansion of the electrodes.

Moreover, in accordance with the size measuring device relating to the present invention, the measuring sensor, which is provided with plate-shaped electrodes having expandability, is characterized in that when a tension is applied to the electrodes so as to be expanded, it specifies the degree of expansion of the electrodes caused by the shape of a user's body based upon a change in the electric resistance value caused by the expansion of the electrodes.

Moreover, the managing server relating to the present invention, which acquires data of values of electrical characteristics of the measuring sensor outputted from the size measuring device, and converts acquired data of values in electrical characteristics into data indicating physical numeric values of the measuring sensor, is characterized in that based upon the converted physical numeric values it determines relative positions among the plural nodes.

Moreover, the managing server relating to the present invention determines information indicating the size or shape of body portions of the user based upon the relative positions among the plural nodes, and transmits information indicating the size or shape of body portions of the user thus determined to the user terminal to be operated by the user.

Moreover, the managing server relating to the present invention is characterized in that based upon the relative positions among the plural nodes thus determined, it deforms the human body model, and based upon the size information indicated by cross-sectional data of the deformed human body model, generates information indicating the size or shape of body portions of the user.

Moreover, the managing server relating to the present invention is provided with a database for managing the size and shape of apparel commodities, and is characterized in that after converting to data indicating physical numeric values, it refers to the database, and retrieves apparel commodities that are coincident with the data indicating the physical numeric values so as to transmit the retrieval results to the user terminal.

Moreover, the managing server relating to the present invention, which stores human body images having a plurality kinds of body types and commodity images having a plurality of kinds that fit to the body types, and determines the body type of a user based upon information indicating the size or shape of a body portion of the user, is characterized in that by extracting a commodity image that fits to the determined body type and by extracting a human body image that fits to the body type or deforming the image so as to fit thereto, a virtual fitting image indicating a human body image wearing the commodity image is generated by composing the extracted or deformed human body image with the extracted commodity image and the virtual fitting image thus generated is transmitted to the user terminal.

Moreover, the user terminal relating to the present invention is characterized in that it acquires data of values of electrical characteristics of the measuring sensor outputted from the size measuring device, and converts acquired data of values in electrical characteristics into data indicating physical numeric values of the measuring sensor, and based upon the converted physical numeric values, it also determines relative positions among the plural nodes, and based upon the relative positions among the plural nodes thus determined, it determines information indicating the size or shape of body portions of the user and outputs the information indicating the size or shape of body portions of the user thus determined.

Moreover, the user terminal relating to the present invention, which transmits information indicating the size or shape of a body portion of the user thus determined to the managing server, is characterized in that it receives retrieval results of apparel commodities that are coincident with the size or shape of the body portion of the user generated by the managing server from the managing server, and outputs the retrieval results.

Moreover, the user terminal relating to the present invention, which based upon information indicating the size or shape of a body portion of the user, determines the body type of the user, and transmits an acquisition request for a commodity image that fits to the determined body type and a human body image to the managing server, is characterized in that upon receipt of the commodity image and the human body image from the managing server, it composes the received body image and commodity image with each other to generate a virtual fitting image indicating a human body image wearing the commodity image and outputs the virtual fitting image thus generated.

Moreover, the user terminal relating to the present invention is provided with a database for managing the size and shape of apparel commodities, and is characterized in that after converting to data indicating physical numeric values, it refers to the database, and retrieves apparel commodities that are coincident with the data indicating the physical numeric values so as to output the retrieval results.

Moreover, the user terminal relating to the present invention, which stores human body images having a plurality kinds of body types and commodity images having a plurality of kinds that fit to the body types, and determines the body type of a user based upon information indicating the size or shape of a body portion of the user, is characterized in that by extracting a commodity image that fits to the determined body type and by extracting a human body image that fits to the body type or deforming the image so as to fit thereto, a virtual fitting image indicating a human body image wearing the commodity image is generated by composing the extracted or deformed human body image with the extracted commodity image, and the virtual fitting image thus generated is outputted.

Moreover, the size measuring system relating to the present invention is provided with the above-mentioned size measuring device, user terminal operated by a user, and managing server that acquires values of electrical characteristics of the measuring sensor outputted from the size measuring device, and converts acquired data of values in electrical characteristics into data indicating physical numeric values of the measuring sensor, and based upon the converted physical numeric values, and determines relative positions among the plural nodes, and the managing server is characterized in that based upon the relative positions among the plural nodes thus determined, it determines information indicating the size or shape of body portions of the user, and transmits information indicating the size or shape of body portions of the user thus determined to the user terminal.

Moreover, in accordance with the size measuring system relating to the present invention, the managing server is characterized in that based upon the determined relative positions between the plural nodes, it deforms the human body model, and based upon size information indicated by cross-sectional data of the deformed human body model, generates information indicating the size or shape of body portions of the user.

Moreover, in accordance with the size measuring system relating to the present invention, the managing server is provided with a database for managing the size and shape of apparel commodities, and is characterized in that after converting to data indicating physical numeric values, it refers to the database, and retrieves apparel commodities that are coincident with the data indicating the physical numeric values so as to transmit the retrieval results to the user terminal.

Moreover, in accordance with the size measuring system relating to the present invention, the managing server transmits information including a URL of a Web page for use in purchasing apparel commodities to the user terminal as commodity retrieval result information indicating the retrieval results for apparel commodities, and the user terminal is characterized in that it acquires the Web page for use in purchasing apparel commodities by using the information including the URL.

Moreover, in accordance with the size measuring system relating to the present invention, the managing server, which stores human body images having a plurality kinds of body types and commodity images having a plurality of kinds that fit to the body types, and determines the body type of a user based upon information indicating the size or shape of a body portion of the user, is characterized in that by extracting a commodity image that fits to the determined body type and by extracting a human body image that fits to the body type or deforming the image so as to fit thereto, a virtual fitting image indicating a human body image wearing the commodity image is generated by composing the extracted or deformed human body image with the extracted commodity image, and the virtual fitting image thus generated is transmitted to the user terminal.

Additionally, an arbitrary combination among the above-mentioned constituent elements and an arrangement in which the constituent elements and expressions of the present invention are included in the method, device, system, computer program, and recording media storing the computer program so as to be mutually substituted are also effectively used as modes of the present invention.

[Effects of the Invention]

The present invention relates to a size measuring device which, when attached to a user, based upon electrical characteristics of a measuring sensor that varies in accordance with a degree of expansion of a base member caused by the shape of the user's body, measures its physical numeric value; therefore, even a user having no specialized size-taking technique can handle the device easily and carry out the size-taking process easily.

BRIEF DESCRIPTION OF THE DRAWINGS

FIG. 4 is a schematic cross-sectional view that shows one example of a configuration of a measuring sensor in accordance with the first embodiment of the present invention; FIG. 4(a) is a view showing a state where no expansion is exerted; and FIG. 4(b) is a view showing a state where an expansion is exerted in a plane direction.

FIG. 9 is a view showing one example of a data configuration of a user measurement DB in accordance with the first embodiment of the present invention.

FIG. 10 is a view showing one example of a data configuration of a commodity DB in accordance with the first embodiment of the present invention.

FIG. 11 is a view showing commodity size information in more detail among data managed by the commodity DB in accordance with the first embodiment of the present invention.

FIG. 12 is a view showing one example of a data configuration of a body type image DB in accordance with the first embodiment of the present invention.

FIG. 13 is a view showing one example of a data configuration of a commodity image DB in accordance with the first embodiment of the present invention.

FIG. 25(a) and FIG. 25(b) are views showing appearances of a size measuring device in accordance with a second modified example of the first embodiment of the present invention.

MODES FOR CARRYING OUT THE INVENTION

First Embodiment

Outline of First Embodiment

A size measuring device 10 in accordance with a first embodiment of the present invention is designed such that when attached to a measuring object, it measures the size and shape of the measuring object.

The measuring object is, for example, a body of a user or another article.

The user terminal 20 is connected to the size measuring device 10 by a short-distance wireless communication network or the like, and when data as a base at the time of inducing the size of the like of the measuring object has been acquired from the size measuring device 10, it transmits the acquired data to the managing server 30.

Upon receipt of the data, the managing server 30 refers to a database installed in itself, and specifies the size or the like of the measuring object, and also retrieves any commodity that is coincident with the size and shape of the measuring object so that it supplies the retrieval results and the size information or the like of the measuring object to the user terminal 20.

The user browses the retrieval results, the size information or the like by using the user terminal 20, and is allowed to order any commodity indicated by the retrieval results, as it is, on the corresponding EC site.

The measuring object is not particularly limited as described above, and in an example explained below, it is supposed to be, for example, a user's body, and the size measuring device 10 is supposed to have a garment shape (shirt, tights, underpants, hats and the like) that a user wears.

Moreover, commodities that are coincident with the measuring object are supposed to be, for example, apparel commodities (clothes, hats, accessories, etc.) that are coincident with the size and shape of the user's body.

Figure 1:
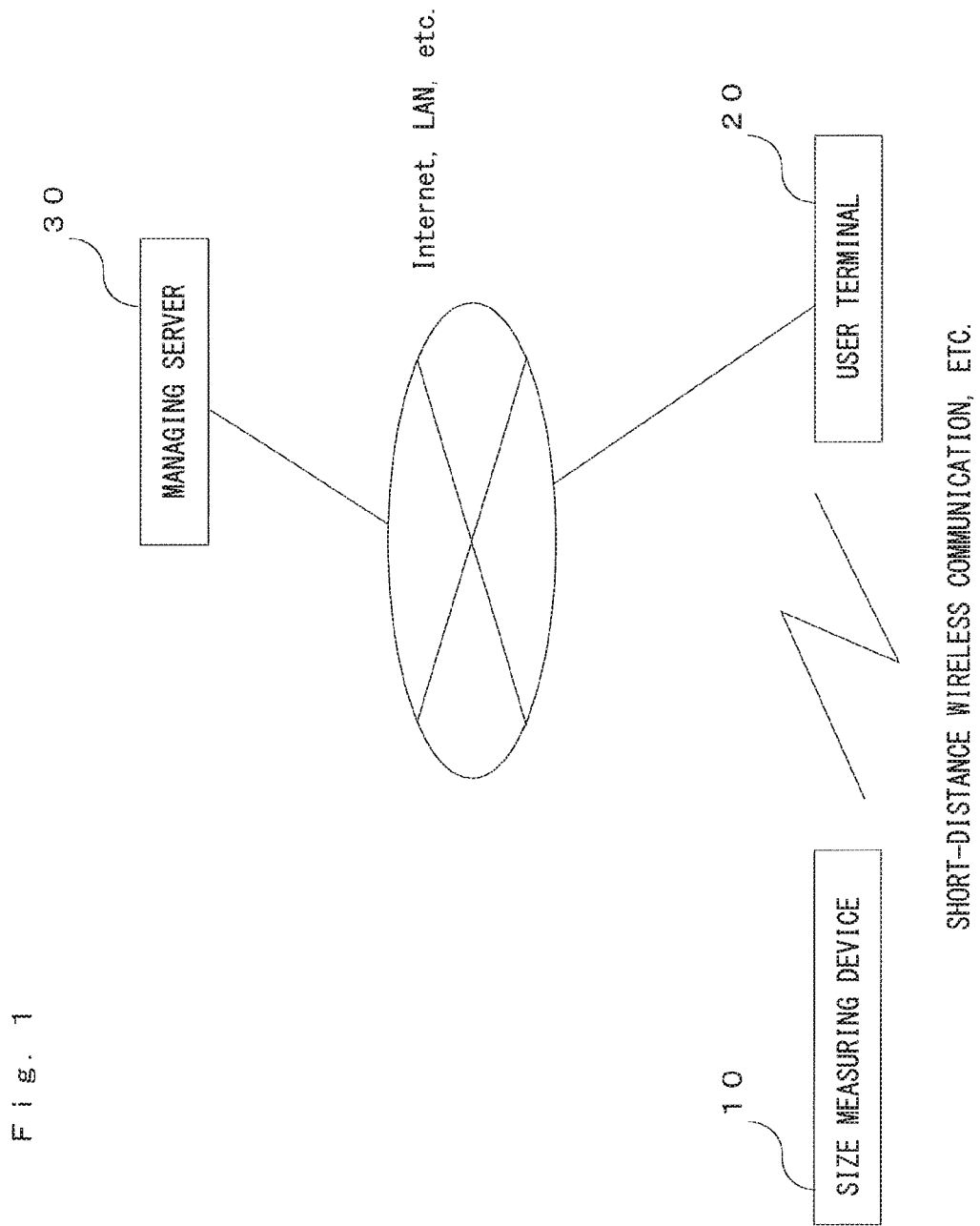
FIG. 1 is a view showing a configuration of a size measuring system in accordance with a first embodiment of the present invention.

Configuration of First Embodiment (1) Entire Configuration of Size Measuring System FIG. 1 is a view showing a configuration of a size measuring system in accordance with the first embodiment of the present invention.

As shown in the drawing, the size measuring system is constituted by the size measuring device 10 that is attached to the body of a user so as to measure the size of the user's body and outputs sensor measurement information indicating the measured size or the like, the user terminal 20 operated by the user who tries to measure the body and the managing server 30 that manages information, such as sizes and shapes of apparel commodities, and supplies user size information corresponding to the information of the body size of the user and commodity retrieval result information corresponding to the information of commodities that fit to the corresponding size to the user terminal 20 based upon the corresponding sensor measurement information.

The size measuring device 10 and the user terminal 20 are communicatably connected with each other through a network, by using short-distance wireless communication, such as, for example, infrared rays, Wi-Fi, Bluetooth (registered trademark) or the like.

The user terminal 20 receives and acquires sensor measurement information including information of the size of the user's body measured by the size measuring device 10 from the size measuring device 10 through the network.

The user terminal 20 is communicatably connected to the managing server 30 through a network, that is, for example, through the Internet, LAN or the like.

The user terminal 20 transmits sensor measurement information acquired from the size measuring device 10 to the managing server 30 through the network.

Upon receipt of the sensor measurement information from the user terminal 20, the managing server 30 determines the body size and body type of the user based upon the received sensor measurement information.

Moreover, the managing server 30 transmits information of apparel commodities that fit to the body size and body type of the user to the user terminal 20.

The size measuring device 10 measures the size and shape of the body of a user although the portion of the body serving as its measuring object is not particularly limited, and in the present embodiment, the device is designed to have, for example, a shape of tights so as to measure the body size and body type of a user, and the managing server 30 is designed to provide information of apparel commodities (pants, underpants, tights or the like) that fit to the body size and body type of the user.

(2) Configuration of Size Measuring Device 10

(Entire Configuration of Size Measuring Device 10)

Figure 2:
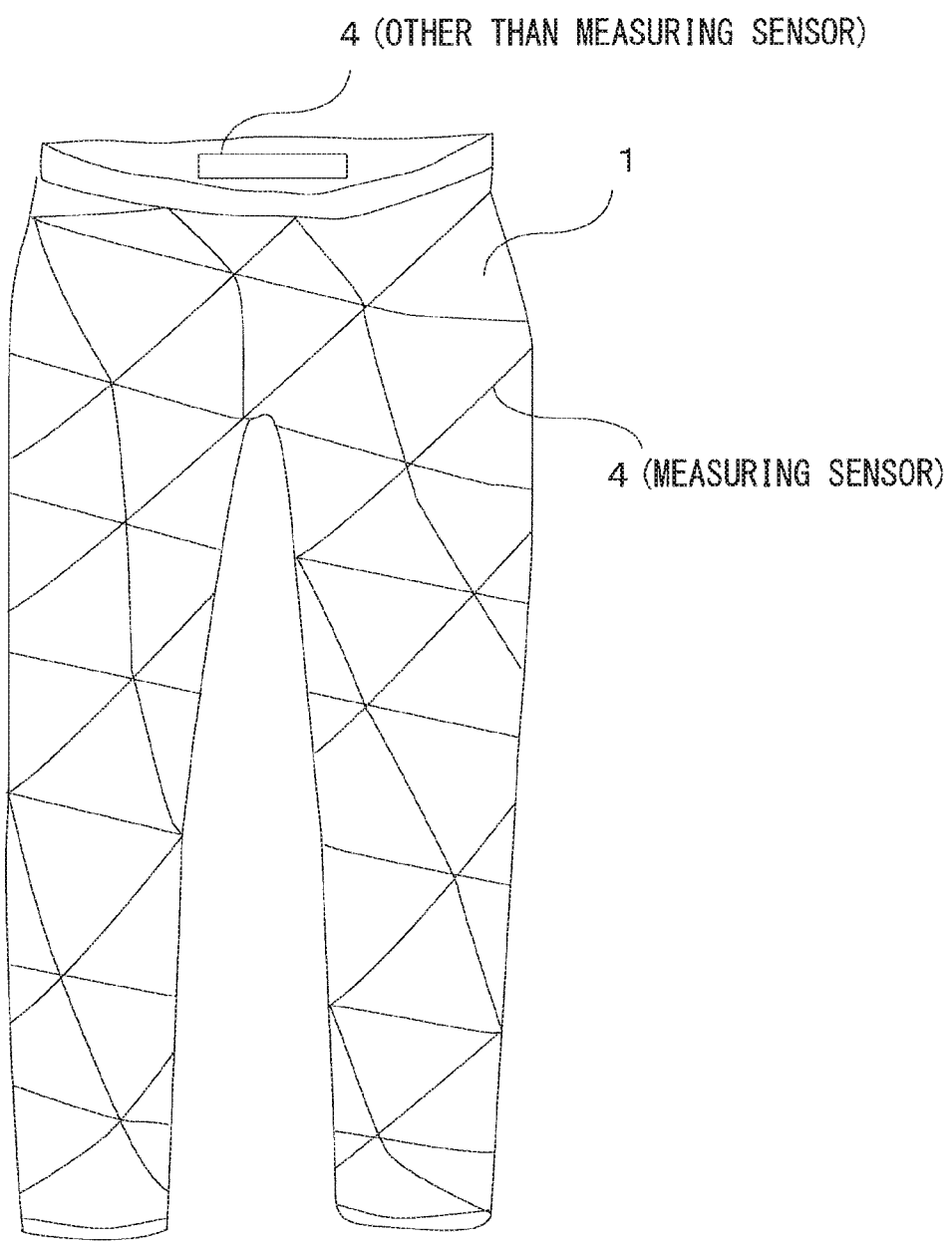
FIG. 2 is a view showing an appearance of a size measuring device in accordance with the first embodiment of the present invention.

FIG. 2 is a view showing an appearance of the size measuring device 10 in accordance with the first embodiment of the present invention.

In the example shown in the drawing, the size measuring device 10 in the present embodiment has a shape of tights, and is constituted by freely expandable materials, such as fibers or the like, as a whole.

When a user attaches the size measuring device 10 to his or her lower body as if putting tights on, the size measuring device 10 expands in response to the size and shape of the lower body of the user so as to measure the size and shape thereof.

For example, by putting on the size measuring device 10 with the waist portion thereof fitting to the waist position of the user, and with the skirt portion of the size measuring device 10 being kept slightly above the ankle of the user, the size measuring device 10 is expanded in a leg length direction in accordance with the body type of the user, and is also expanded in a circumferential direction around the waist, hips and legs in accordance with the shapes of the waist and hips or the thickness of legs or the like.

When the user removes the size measuring device 10 off the lower body as if taking the tights off, the size measuring device 10 is returned to its original size and shape.

As shown in the drawing, the size measuring device 10 is constituted by a main body part 1 forming a shape of tights made of an expandable material, and a measurement processing part 4 that executes measuring processes or the like of the size and shape of the user's body.

As the expandable material for the main body part 1, synthetic fibers or the like, which are formed by mixedly spinning, for example, spandex (polyurethane elastic fibers) with a material having good expandability and elasticity, such as polyester or the like, or other fibers (cotton or the like), are used; however, other materials used for general clothes or the like may be adopted as long as its expandability and elasticity can be ensured.

The measurement processing part 4 is provided with measuring sensors that are expandable together with the expansion of the main body part 1.

The measurement processing part 4 is designed such that when the size measuring device 10 is attached to a user, it detects the body size and body type of the user by measuring the lengths of the measuring sensors.

Moreover, in the example of the drawing, a measurement processing part 4 except for the measuring sensors is attached to a position corresponding to a lining of the waist portion of the main body part 1 having a tights shape; however, this arrangement is exemplary only, and the present invention is not intended to be limited by this arrangement.

Figure 3:
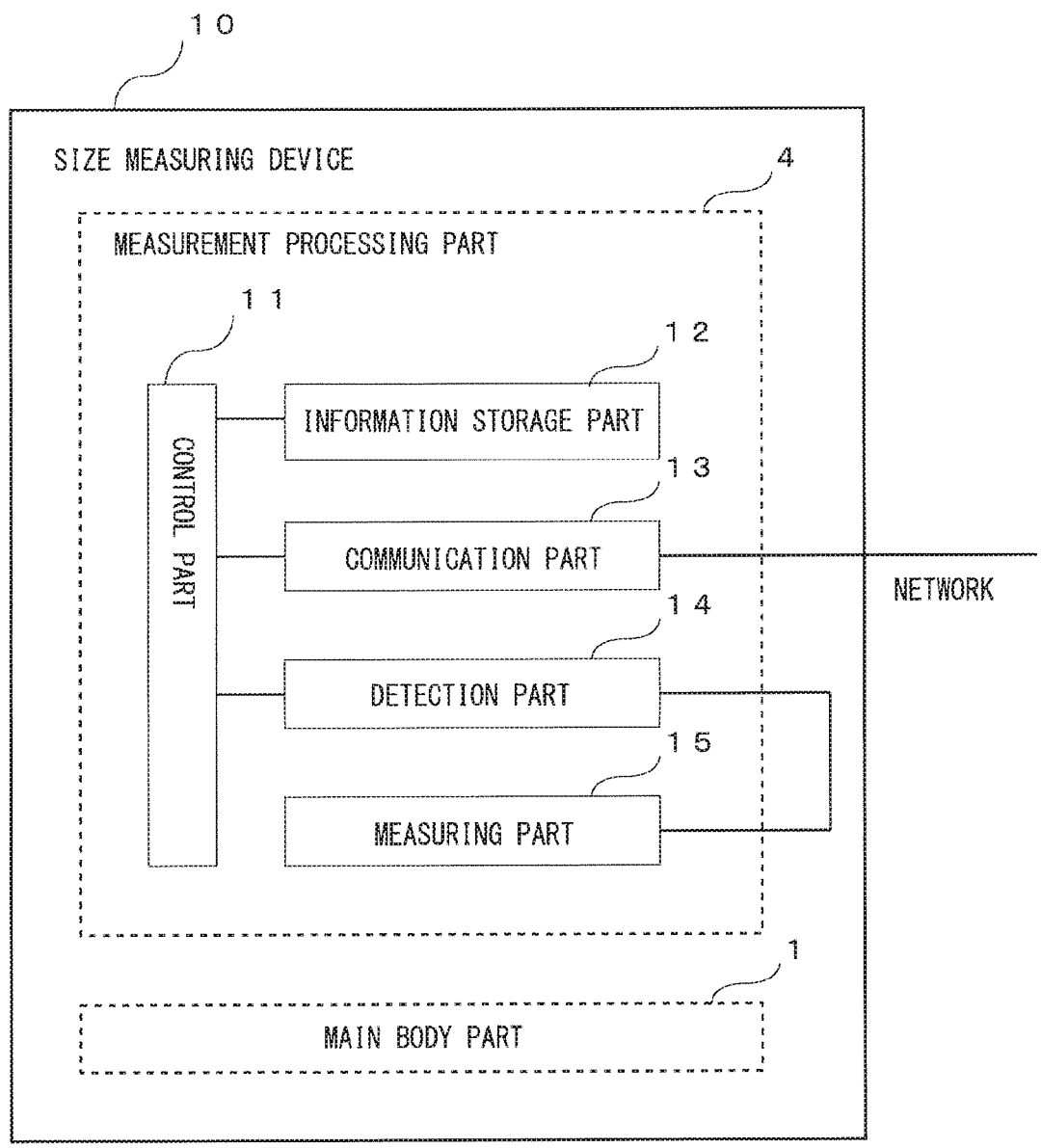
FIG. 3 is a block diagram showing the size measuring device in accordance with the first embodiment of the present invention.

FIG. 3 is a block diagram showing the size measuring device 10 in accordance with the first embodiment of the present invention.

As shown in the drawing, the measurement processing part 4 of the size measuring device 10 is provided with a control part 11 constituted by a CPU or the like for controlling the entire size measuring device 10, an information storage part 12 constituted by a ROM, RAM or the like for storing sensor measurement information or the like, a communication part 13 that carries out communications with the user terminal 20 through a short-distance wireless communication or the like, a detection part 14 for detecting measured values of a measuring sensor to be described later and a measuring part 15 constituted by one or more measuring sensors for measuring the size, shape or the like of a user's body.

The detection part 14 converts an analog signal indicating the size, shape or the like of the user's body measured by the measuring part 15 (measuring sensor) into a digital signal, and inputs the resulting signal to the control part 11.

The measuring part 15, which is constituted by a plurality of measuring sensors or the like and the measuring sensors, which measure physical numeric values based upon a change in an electrical characteristic, are installed on the main body part 1.

(Configuration of Measuring Sensor)

FIG. 4(*a*) and FIG. 4(*b*) are schematic cross-sectional views that show one example of a configuration of a measuring sensor 1200 in accordance with the first embodiment of the present invention, and FIG. 4(*a*) is a view showing a state where no expansion is exerted; and FIG. 4(*b*) is a view showing a state where an expansion is exerted in a plane direction.

By using the drawings, the following description will explain the configuration of the measuring sensor 1200 used in the size measuring device 10 in the present embodiment.

As shown in the drawings, the measuring sensor 1200 is constituted by a dielectric film 1201, and electrodes 1202 and 1203 that are respectively fixed on both of the surface and rear surface of the dielectric film 1201.

The dielectric film 1201 is formed into a sheet shape, and made to be elastically deformable.

As a material forming the dielectric film 1201, it is mainly made of elastomer, and examples of the elastomer include silicone rubber, acrylonitrile butadiene copolymer rubber, acrylic rubber, epichlorohydrin rubber, chlorosulfonated polyethylene, chlorinated polyethylene, urethane rubber and the like.

The electrodes 1202 and 1203 are also formed into a sheet shape in the same manner as in the dielectric film 1201, and made to be elastically deformable.

As a material forming the electrodes 1202 and 1203, these are mainly made of elastomer, and examples of the elastomer include silicone rubber, ethylene-propylene copolymer rubber, natural rubber, styrene-butadiene copolymer rubber, acrylonitrile butadiene copolymer rubber, acrylic rubber, epichlorohydrin rubber, chlorosulfonated polyethylene, chlorinated polyethylene, urethane rubber and the like.

Each of the electrodes 1202 and 1203 is constituted by forming or containing a conductive material expandably onto the above-mentioned elastomer so that even when the electrodes 1202 and 1203 are expanded together with the dielectric film 1201, its conductivity is maintained.

The electrostatic capacitance C of the measuring sensor 1200 can be found by using the following formula.

$$C = \epsilon \cdot S / d \quad \text{formula (1)}$$

(C: electrostatic capacitance, $\epsilon$: dielectric constant, S: area of electrode 1202 (electrode 1203), d: distance between electrodes 1202 and 1203)

As shown in FIG. 4(*a*) and FIG. 4(*b*), in the case when, for example, a force is applied onto the electrodes 1202 and 1203 of the measuring sensor 1200 in an expansion direction relative to the plane direction thereof, since the area S of each of the dielectric film 1201 and the electrodes 1202, 1203 is expanded so that the film thickness of the dielectric film 1201 becomes smaller to subsequently cause the distance d between the electrodes 1202 and 1203 to become smaller. By this change, the electrostatic capacitance C between the electrodes 1202 and 1203 increases based upon the above-mentioned formula (1).

In the present embodiment, the above-mentioned belt-shape expansion-type measuring sensor 1200 is attached to the main body part 1 so as to be expanded substantially linearly in the belt length direction when the size measuring device 10 is attached to the user.

To each of the electrodes 1202 and 1203, one end of each of wires is connected, and the other end of each of the wires is connected to a detection part 14 through a node.

When a detection signal is inputted thereto from the measuring sensor 1200, the detection part 14 stores the value of the detection signal in the information storage part 12.

Since the detection signal has its amplitude of waveform varied in response to the electrostatic capacitance between the electrodes 1202 and 1203, the electrostatic capacitance between the two electrodes 1202 and 1203 can be measured (calculated) by measuring the amplitude.

The measuring sensor, which is formed by allowing the dielectric film 1201 to be sandwiched between the electrodes 1202 and 1203 in this manner, has its electrostatic capacitance varied when expanded in a plane direction; therefore, by measuring the change amount of the electrostatic capacitance, an expansion type measuring sensor which measures how much degree the measuring sensor is physically expanded can be prepared.

Additionally, in the present embodiment, the measuring sensor 1200 has a three layer configuration in which the dielectric film 1201 is disposed between the two electrodes 1202 and 1203; however, a configuration having three or more layers in which between each pair of electrodes, a dielectric film is disposed as in the case of an electrode, a dielectric film, an electrode, a dielectric film, an electrode . . . etc., may be used.

In this configuration also, the respective electrodes are connected to the detection part 14 through wires.

(Layout Example of Measuring Sensor)

Figure 5:
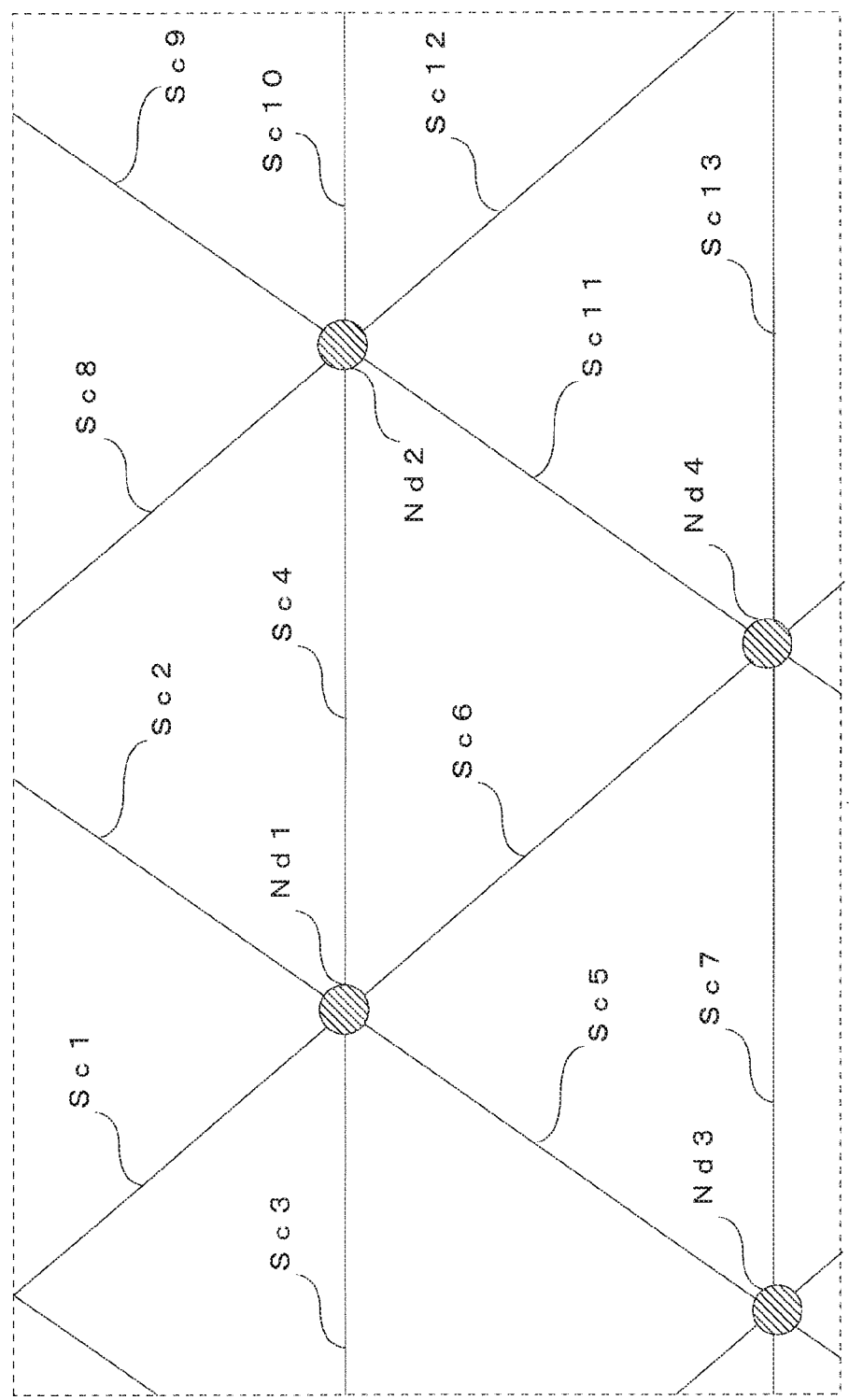
FIG. 5 is an enlarged view showing a layout of measuring sensors of the size measuring device in accordance with the first embodiment of the present invention.

FIG. 5 is an enlarged view showing a layout of measuring sensors of the size measuring device 10 in accordance with the first embodiment of the present invention.

Referring to the view, the following description will explain the layout of the respective measuring sensors.

Each of the measuring sensors Sc1 to Sc13 serves as a capacitor in which a dielectric film is formed between a pair of electrodes, and is formed into an expandable belt shape.

As shown in the drawing, these plural measuring sensors Sc1 to Sc13 are disposed in a triangular polygonal shape in which a plurality of triangles are adjacent to one another on the main body part 1. That is, the respective measuring sensors Sc1 to Sc13 form one of sides of each triangle, and mutually adjacent sides of the triangles share one measuring sensor.

In the present embodiment, the intersecting portion or the contact portion between the belt-shaped ends of the measuring sensors disposed into a triangular polygonal shape is represented by a concept as a node.

In the example of the drawing, nodes Nd1 to Nd4 each of which outputs a value of electrostatic capacitance of each of the measuring sensors Sc1 to Sc13 are positioned at two ends in the belt length direction of each of the measuring sensors Sc1 to Sc13.

By detecting an output signal from each of the measuring sensors Sc1 to Sc13, the detection part 14 detects the value of the electrostatic capacitance of each of the measuring sensors Sc1 to Sc13.

Based upon the electrostatic capacitance of each of the measuring sensors Sc1 to Sc13, the size measuring system measures the length of each of the measuring sensors Sc1 to Sc13.

The respective measuring sensors Sc1 to Sc13 share nodes between adjacent measuring sensors.

In the measuring sensors Sc1 to Sc13 in the present embodiment, since they are disposed into a polygonal pattern, with triangles being adjacent to one another, the respective nodes Nd1 to Nd4 are share by six measuring sensors.

As described above, on the main body part 1 of the size measuring device 10, expansion type measuring sensors 1200 are disposed in a triangular polygonal shape.

Moreover, the control part 31 generates a cylinder model in which a plurality of ring units, each of which serves as a constituent unit formed by alternately connecting a plurality of measuring sensors and nodes into a ring shape, are superposed in a cylinder height direction, with predetermined intervals spaced therebetween, in accordance with the shape of the size measuring device 10.

For example, in the case when the shape of the size measuring device 10 is a tights shape as in the case of the present embodiment, the control part 31 decomposes the entire size measuring device 10 having the tights shape into three portions of a waist portion and right and left two leg portions, and generates cylinder models by replacing the respective portions with three cylinders.

The control part 31 determines the lengths of the measuring sensors based upon the values of electrostatic capacitance of the respective measuring sensors disposed on the respective cylinder models, and further determines cylinder coordinates of each of nodes at the two ends of each measuring sensor based upon the values of the lengths of the measuring sensors so as to finally measure the body size and body type of the user wearing the size measuring device 10.

Detailed explanations of the determining processes of the cylinder coordinates of the respective nodes will be given later.

Figure 6:
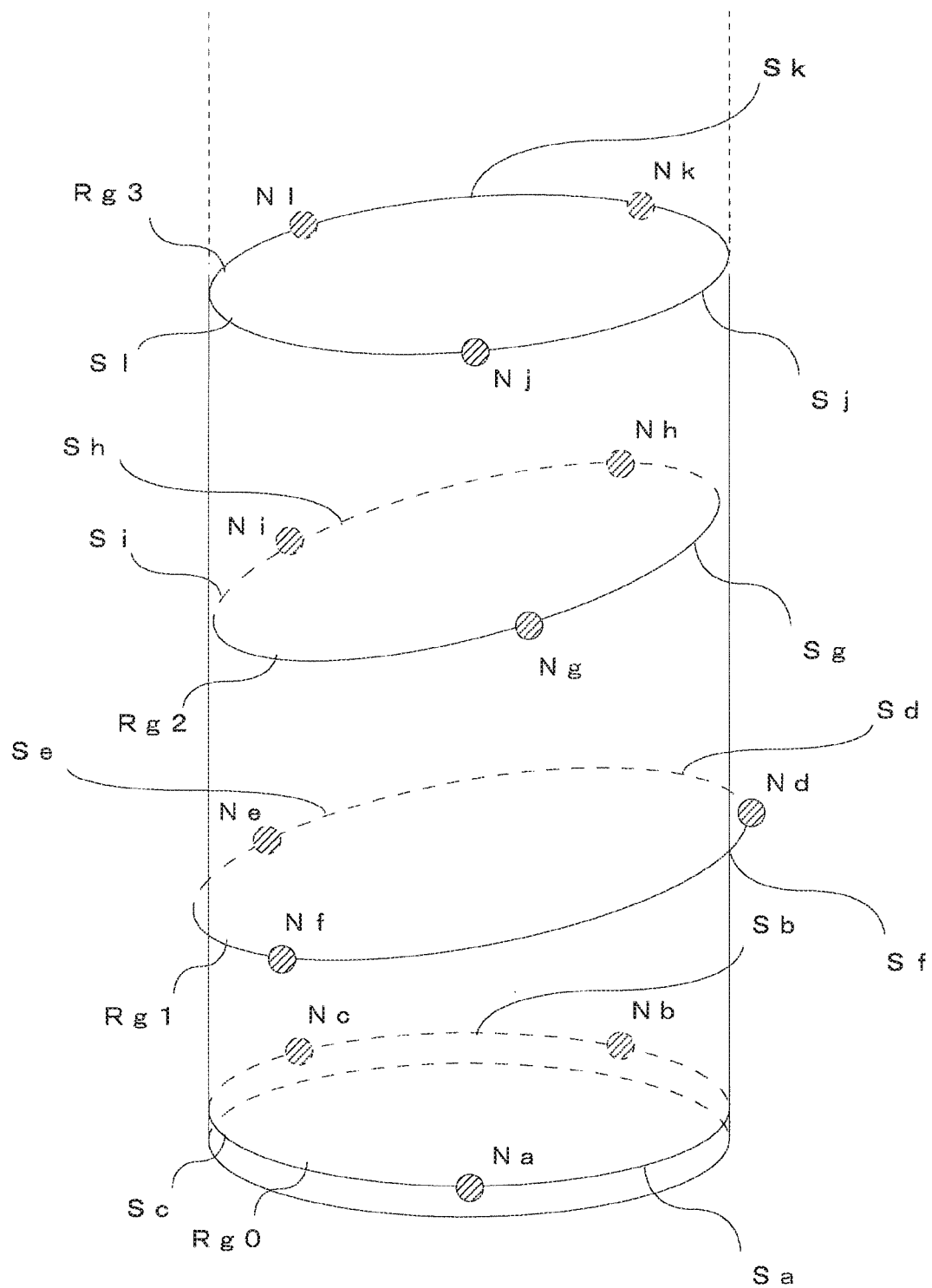
FIG. 6 is a view showing one example of a cylinder model in accordance with the first embodiment of the present invention.

FIG. 6 is a view showing one example of a cylinder model in accordance with the first embodiment of the present invention.

As described above, the plural measuring sensors are disposed at positions corresponding to the respective sides of the triangular polygons, and when an attention is paid to the circumferential direction of the bottom surface of the cylinder model in FIG. 6, the plural measuring sensors are connected into a ring shape and disposed in a manner so as to wind around the cylinder model one time through the nodes; thus, the ring unit is constituted.

The measuring sensor and the nodes forming each ring unit are positioned on the same plane, and these constituent elements are formed into a circular shape or an elliptical shape.

As shown in the drawing, each of the ring units Rg0 to Rg3 is disposed in the circumferential direction of the cylinder model so as to be wound around one time, and the plural measuring sensors and the plural nodes that constitute the respective ring units are disposed on the circumference of the same circle or ellipse.

For example, the ring unit Rg0 is constituted by measuring sensors Sa to Sc and nodes Na to Nc disposed on the two ends of the measuring sensors Sa to Sc, and these measuring sensors Sa to Sc and nodes Na to Nc are disposed on the same circumference.

Moreover, the circle or ellipse formed by the ring unit is sometimes kept in parallel with the bottom surface of the cylinder model, or is sometimes inclined relative to the bottom surface with a predetermined angle.

The numbers of the measuring sensors and nodes forming one ring unit are not particularly limited as long as they are three or more; however, in the present embodiment, for example, the numbers of the measuring sensors and nodes forming one ring unit are supposed to be respectively three.

Additionally, among the respective ring units Rg0 to Rg3, between the respective nodes Na to N1 are connected by measuring sensors; however, these are omitted from the present view.

Additionally, among the ring units, there are some in which one portion of the cylinder coordinates of a node for use as a reference of cylinder coordinates at the time of determining cylinder coordinates of each of the nodes have been set to known values. Hereinafter, the ring unit whose cylinder coordinates have been already set is referred to as "reference ring unit" and the nodes forming the reference ring unit are referred to as "reference nodes".

The height of the cylinder coordinates of each of the reference nodes forming the reference ring unit is preliminarily set at "0". Moreover, the angle of the cylinder coordinates of one of the reference nodes among the reference nodes forming the reference ring unit is preliminarily set at "0".

By using the cylinder coordinates of the reference node as a reference, the control part 31 of the managing server 30 successively determines the relative positions (cylinder coordinates) of the other nodes that belong to the same cylinder model.

The control part 31 executes determining processes of the cylinder coordinates of the nodes for each of the cylinder models (waist and two legs).

In the example of FIG. 6, the ring unit Rg0 is the reference ring unit, and nodes Na, Nb and Nc constituting this unit are reference nodes.

The heights of cylinder coordinates of all the reference nodes Na, Nb and Nc are set to "0", and among these, the angle of the cylinder coordinates of the reference node Na is set to "0".

(3) Configuration of User Terminal 20

The user terminal 20 is an information processing device that a user who measures the size and shape of the body of himself or herself operates, and corresponds to, for example, a smartphone, a tablet-type terminal, a portable telephone, a PDA, a PC or the like.

Figure 7:
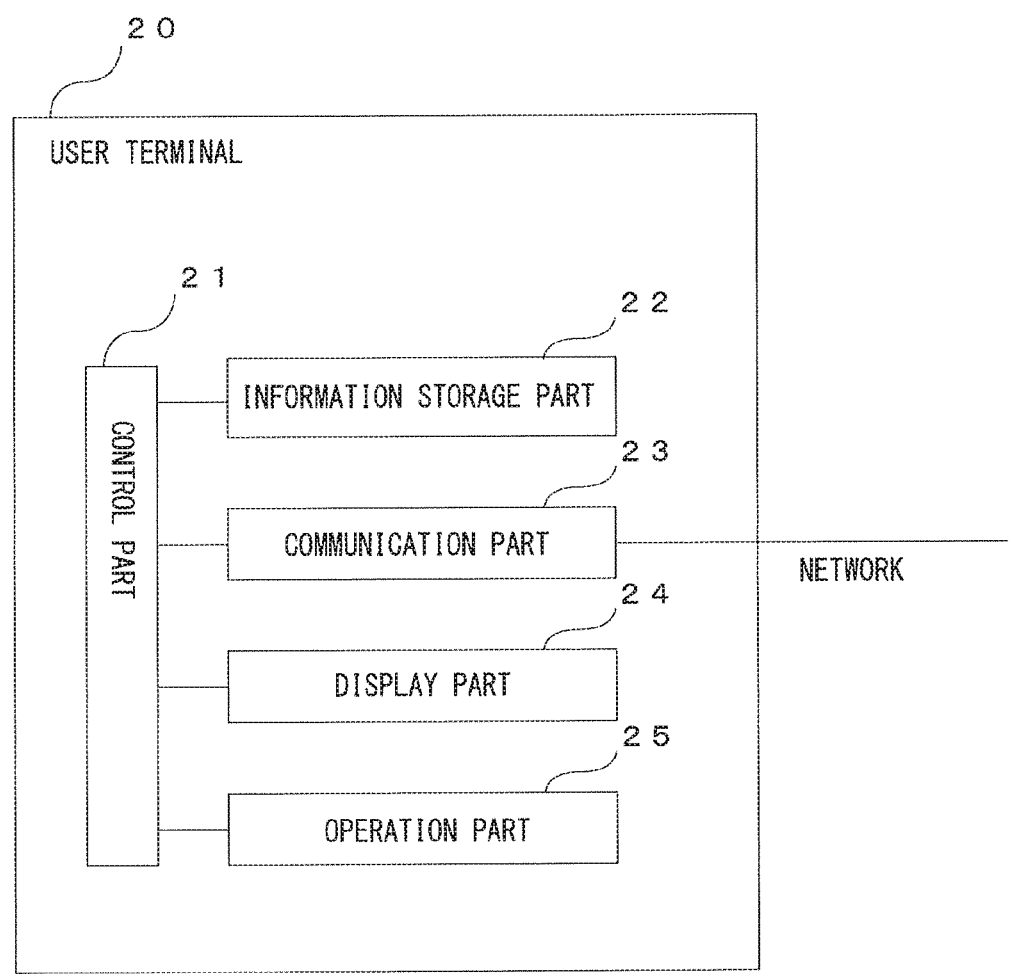
FIG. 7 is a block diagram showing a configuration of a user terminal in accordance with the first embodiment of the present invention.

FIG. 7 is a block diagram showing a configuration of the user terminal 20 in accordance with the first embodiment of the present invention.

As shown in the drawing, the user terminal 20 is constituted by a control part 21 that is constituted by a CPU or the like for controlling the entire user terminal 20, an information storage part 22 for storing various kinds of information, a communication part 23 that carries out communications with the managing server 30 through a network, such as the Internet, LAN or the like, and also carries out communications with the size measuring device 10 through a short-distance wireless communication or the like, such as wireless LAN, Bluetooth (registered trademark), or the like, a display part 24 for displaying information on a display or the like, and an operation part 25 for carrying out inputting processes through various kinds of keys, a touch panel, a microphone, or the like.

Additionally, as described above, the user terminal 20 is desirably designed to transmit and receive information to and from the size measuring device 10 through a short-distance wireless communication; however, the communications may be carried out by being mutually connected to each other through wires (cables).

Upon receipt of sensor measuring information from the size measuring device 10, the communication part 23 transmits the received sensor measuring information to the managing server 30.

Thereafter, when the communication part 23 of the user terminal 20 has received the user size information indicating the body size of the user from the managing server 30, the control part 21 can display on the display part 24 as to how much length the size of any portion of the user's body has based upon the received user size information.

Moreover, when the communication part 23 has received commodity retrieval results information corresponding to information of apparel commodities that are suitable for the body size of the user indicated by the user size information from the managing server 30, the control part 21 can also display the received information on the display part 24.

With respect to the commodity retrieval results information (Web page, etc.) displayed on the display part 24, the user is allowed to purchase the corresponding commodity, as it is, on the online shop by operating the operation part 25.

(4) Configuration of Managing Server 30

The managing server 30 is an information processing device which, based upon the sensor measurement information transmitted from the user terminal 20, outputs and manages the user size information including the size information of the user's body, and supplies the corresponding user size information to the user terminal 20.

Moreover, the managing server 30 preliminary stores a plurality of pieces of commodity information indicating the size or the like of apparel commodities, and based upon the user size information, refers to the database of the commodity information, and retrieves apparel commodities that are suitable for the size and shape of the user's body, and supplies the retrieval results (commodity retrieval results information) to the user terminal 20.

Figure 8:
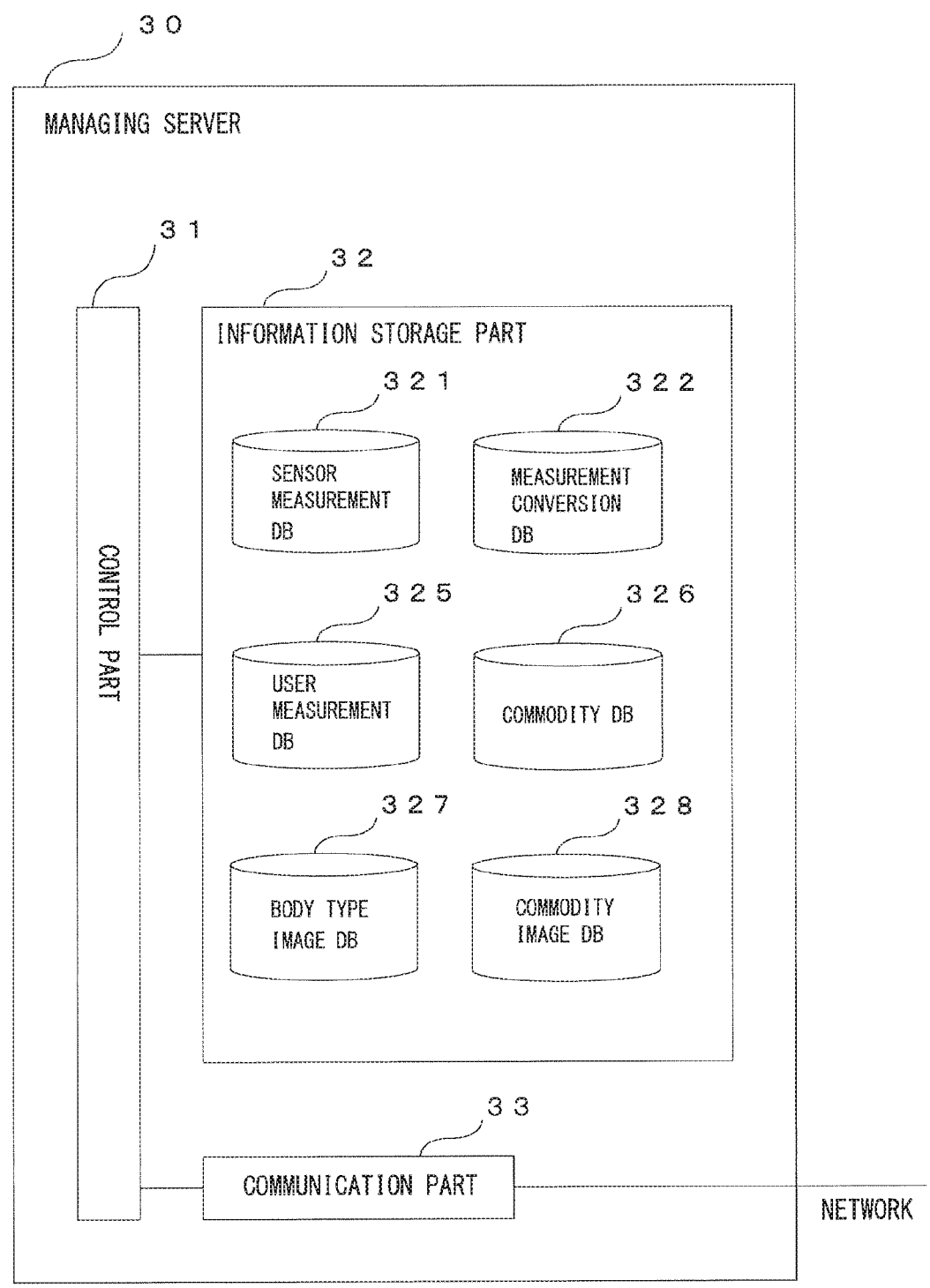
FIG. 8 is a block diagram showing a configuration of a managing server in accordance with the first embodiment of the present invention.

FIG. 8 is a block diagram showing a configuration of the managing server 30 in accordance with the first embodiment of the present invention.

As shown in the drawing, the managing server 30 is provided with a control part 31 that is constituted by a CPU or the like, and controls the entire managing server 30, an information storage part 32 for storing the sensor measurement information, the user size information and the commodity information, etc., and a communication part 33 for carrying out communications with the user terminal 20 through a network such as the Internet, LAN or the like.

The information storage part 32 of the managing server 30 stores a sensor measurement DB321 serving as a database for managing the sensor measurement information corresponding to measured values of the respective measuring sensors relating to the user and the sensor size information representing physical numeric values, such as the length or the like of the corresponding measuring sensors so as to be made associated with a user ID for identifying the user, a measurement conversion DB322 for converting the sensor measurement information to the sensor size information, a user measurement DB325 serving as a database for managing the user size information indicating the body size of the user, a commodity DB326 serving as a database for managing commodity information representing the contents and the size, etc. of an apparel commodity so as to be made associated with a commodity ID identifying the apparel commodity, a body type image DB327 for managing human body images for each of the body types, and a commodity image DB328 for managing images (commodity images) of apparel commodities for each of the body types.

The sensor measurement DB321 is a database for managing the sensor measurement information indicating the measured value (electrostatic capacitance) by the above-mentioned size measuring device 10 and the sensor size information indicating the value of the length of the measuring sensor converted by using the measurement conversion DB322.

Upon receipt of the above-mentioned sensor measurement information from the user terminal 20, the control part 31 of the managing server 30 registers the received sensor measurement information in the sensor measurement DB321, and also registers the sensor size information obtained by converting the received sensor measurement information by using the measurement conversion DB322 in the sensor measurement DB321 all together.

The measurement conversion DB322 is a database for converting the value of electrostatic capacitance of each of the measuring sensors to a length value.

The measurement conversion DB322 manages the value of electrostatic capacitance of each of the measuring sensors and the length of each measuring sensor indicated by the value so as to be made associated with each other.

When the managing server 30 has received the sensor measurement information (value of electrostatic capacitance of the measuring sensor) from the user terminal 20, the control part 31 of the managing server 30 refers to the measurement conversion data DB322 so as to convert the received value of electrostatic capacitance to the length value (sensor size information) of the measuring sensor.

Based upon the converted sensor size information, the managing server 30 generates user size information corresponding to information indicating the body size of the user.

The control part 31 of the managing server 30 determines cylinder coordinates of a plurality of nodes disposed on the main body part 1 of the size measuring device 10 on the respective cylinder models, and by detecting the distance between the nodes based upon the cylinder coordinates of the nodes thus determined, it can determine the body type and the size of each of body portions of the user.

The user measurement DB325 is a database for managing the user size information indicating the value of each of sizes of the body portions of the user.

FIG. 9 is a view showing one example of the data configuration of the user measurement DB 325 in accordance with the first embodiment of the present invention.

As shown in the drawing, in the user measurement DB 325, pieces of user size information for the respective users, which are determined based upon the cylinder coordinates of the respective nodes, are registered for each of sizes L1 to L4 . . . etc.

The sizes L1 to L4 . . . etc. are sizes of the waist, the inseam or the like of the user generally used upon wearing clothes or like; however, not limited to these, all body sizes are included therein.

Additionally, in the information storage part 32, a program in which a generation algorithm for the above-mentioned user size information is described is stored so that in the generation algorithm of the user size information, description is given as to the distance between which paired nodes each of sizes L1 to L4 . . . etc. of the user size information corresponds to.

The control part 31 reads out the program, and executes the generation process of the user size information based upon the sensor size information by using the algorithm.

The commodity DB 326 is a database for managing commodity information of apparel commodities.

FIG. 10 is a view showing one example of a data configuration of the commodity DB 326 in accordance with the first embodiment of the present invention.

As shown in the drawing, the commodity DB 326 has its commodity size information indicating the sizes of the apparel commodities preliminarily measured by a predetermined method and its other information relating to the apparel commodities (shapes, colors, designs, types, makers, prices, image information, URL or the like of sales pages of apparel commodities on an online shop, etc.) registered as commodity information so as to be made associated with commodity IDs for use in identifying the apparel commodities.

FIG. 11 is a view showing the commodity size information in more detail among data managed by the commodity DB 326 in accordance with the first embodiment of the present invention.

As shown in the drawing, in the commodity DB 326, pieces of commodity size information of the respective apparel commodities are registered for each of the sizes of L1 to L4 . . . , etc.

The sizes of L1 to L4 . . . , etc. of the commodity DB 326 correspond to the sizes L1 to L4 . . . , etc. of the user measurement DB 325.

Moreover, in the commodity DB 326, for each of pieces of the commodity size information, its retrieval range is also registered. In each of the retrieval ranges, numeric values of the above-mentioned commodity size information corresponding to each of the retrieval ranges are included.

In the example shown in the drawing, the commodity size information of size L1 of apparel commodities in the commodity ID "S0001" is "72.0", and its retrieval range is "70.0 to 75.0" indicated in parentheses, and in the case when the measurement size information of the body of a user is "72.0", since the user size information is included within the retrieval range, the control part 31 of the managing server 30 determines that information of the apparel commodities of the commodity ID "S0001" is possibly included in the commodity retrieval results information to be supplied to the user terminal 20.

The control part 31 carries out the above-mentioned retrieving processes on each of the apparel commodities of each of the sizes L1 to L4 . . . , etc. so as to extract commodity information of apparel commodities suitable for the body size of the user.

Additionally, the extraction method for the above-mentioned apparel commodities is not particularly limited.

For example, only when included within the retrieval ranges of all the sizes L1 to L4 . . . , etc., commodity information of the corresponding apparel commodity may be extracted, or even when included within a partial retrieval range of sizes among the above-mentioned sizes, the commodity information may be extracted.

Moreover, the numeric value width of the retrieval range may be set to an arbitrary value by the user and registered in the commodity DB 326, or may be automatically set by the control part 31 of the managing server 30 depending on kinds, materials or the like of the respective apparel commodities.

For example, when the apparel commodity is made of a material having high expandability, the control part 31 may set the numeric value width of the retrieval range to a wider width, while in contrast, when made of a material having low expandability, it may set the numeric value width of the retrieval range to a narrower width.

The managing server 30 transmits commodity information for one or more apparel commodities extracted as the results of the above-mentioned retrieval to the user terminal 20 as commodity retrieval results information.

Upon receipt of the commodity retrieval results information from the managing server 30, the user terminal 20 displays the received commodity retrieval results information on the display part 24.

In this case, as the commodity retrieval results information, for example, various character information and image information of apparel commodities that are coincident with the size and shape of the user's body, or have sizes and shapes close thereto within a predetermined range are displayed.

The user can browse the displayed commodity retrieval results information and know information of apparel commodities that fit to the body of himself and herself, and makes it possible to make reference at the time of purchasing an apparel commodity.

Moreover, when the user clicks or the like the URL displayed on the commodity retrieval results information, the user terminal 20 transmits a Web page acquisition request for the corresponding URL to the Web server, and the Web server transmits the purchase page of apparel commodity on the above-mentioned commodity retrieval results information, that is, the corresponding Web page, to the user terminal 20.

Upon receipt of the purchase page, the user terminal 20 displays it on the display part 24.

Thereafter, the user can purchase the corresponding apparel commodity at the online shop through the purchase page. Since the purchasing processes at the online shop have the same contents as those of the known process, the explanation thereof will be omitted.

A body type image DB 327 is a database for managing human body images for each of the body types.

As the human body images, many patterns, such as a thin body type, an athlete body type, a fat body type, or the like, are prepared for each of the body types, and stored in the information storage part 32 of the managing server 30.

FIG. 12 is a view showing one example of a data configuration of the body type image DB 327 in accordance with the first embodiment of the present invention.

As shown in the drawing, body type IDs (B001, B002, ..., etc.) for use in identifying the corresponding body type are assigned to the respective body types, and the body type images are also stored in the information storage part 32 so as to be made associated with the respective body type IDs.

Moreover, as shown in the drawing, in the body type image DB327, ratios between the respective sizes L1 to L4, that is, "L1/L2", "L1/L3", "L1/L4", ..., etc., are managed so as to be made associated with the body type IDs.

The sizes L1 to L4, ..., etc. of the corresponding body type image DB327 are made associated with the sizes L1 to L4, ..., etc. of the user measurement DB325.

Moreover, in the body type data DB327, retrieval ranges are set for the respective ratios of the sizes L1 to L4 in the user size information In this case, in the case when the ratios of the respective sizes L1 to L4 in the user size information, that is, "L1/L2", "L1/L3" and "L1/L4", are respectively represented by "0.86", "1.4" and "1.5", since the ratios of these sizes L1 to L4 are all included within the retrieval ranges of the size ratios "L1/L2", "L1/L3"and "L1/L4" of the body type ID "B001", the control part 31 determines that the body type of the corresponding user is body type ID "B001".

Additionally, the determining method of the body type of the user is not particularly limited.

For example, only when included within the retrieval range of the ratios of all the sizes, the determination may be made as the corresponding body type, or when included within the retrieval range of the ratios of some sizes also, such a determination may be made.

Moreover, the numeric value width of the retrieval range may be preliminarily set to an arbitrary value width by the user, and this may be registered in the body type image DB327.

The commodity image DB328 is a database for managing commodity images. In the commodity images of respective commodities, many patterns are prepared for each of the above-mentioned body type IDs, and registered in the information storage part 32.

Each of the commodity images is formed on the assumption that a user having the corresponding body type wears the commodity so that in accordance with the respective body types, an expanded state of the cloth of the apparel commodity or wrinkled state of the cloth thereof and the like are preliminarily reproduced. For example, even in the case of the same commodities, different images are prepared such that the commodity image for the type of a stout body has no wrinkles, while the commodity image for the type of a thin body has many wrinkles.

FIG. 13 is a view showing one example of a data configuration of the commodity image DB328 in accordance with the first embodiment of the present invention.

As shown in the drawing, the commodity image DB328 manages commodity images for each of the commodities as well as for each of the body types.

In the example of the drawing, commodity images of the commodity ID "S0001" are shown when worn by users of the body type IDs of "B001", "B002", "B003" and "B004" as commodity images having the respective commodity image IDs of "SI00011", "SI00012", "SI00013" and "SI00014".

As described above, when the control part 31 of the managing server 30 generates user size information of the user, it determines a body type corresponding to the ratio of sizes of the user size information.

Moreover, as described above, the control part 31 retrieves commodities that fit to the user's size.

Then, the control part 31 extracts a human body image corresponding to the user's body type from the information storage part 32, and also extracts a commodity image corresponding to the body type ID of the determined body type relative to the retrieved commodities from the information storage part 32 so that by composing the extracted commodity image with the extracted human body image, an image of a person wearing the apparel commodity (hereinafter, referred to as "virtual fitting image") is generated.

The managing server 30 transmits the virtual fitting image thus generated to the user terminal 20.

Upon receipt of the virtual fitting image, the user terminal 20 displays the image.

The body type of the person displayed on the virtual fitting image is coincident with the body type of the user, and since the image of the commodity represents a state very close to the state in which the user is actually wearing the commodity, the user can readily image the commodity and easily consider the purchasing of the commodity.

Operations of the First Embodiment (1) Supplying Operations of User Size Information and Commodity Retrieval Results Information Next, the following description will explain measuring operations of the size or the like of a body of a user with the size measuring system in accordance with the first embodiment of the present invention.

Figure 14:
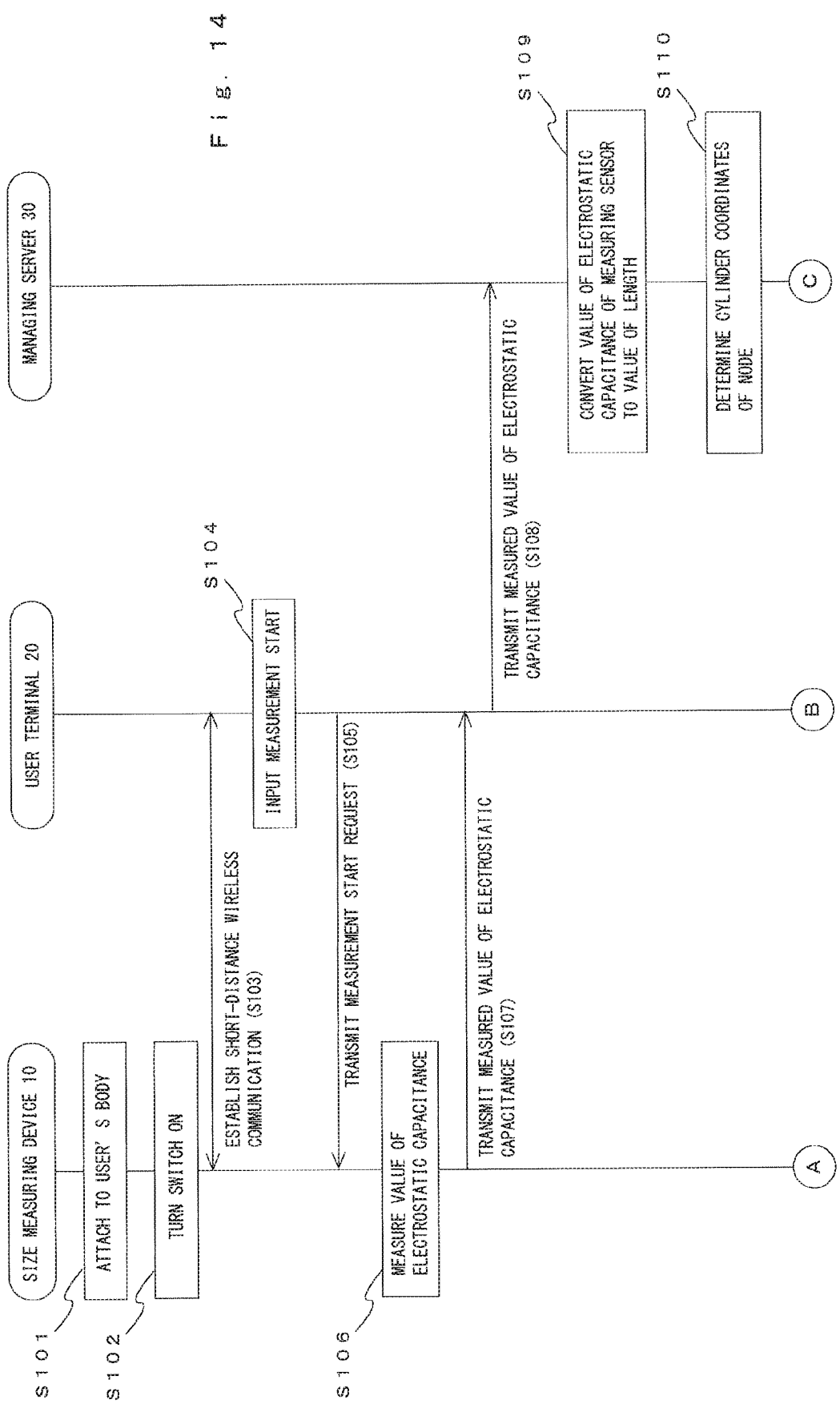
FIG. 14 is a sequence chart showing a flow of measuring operations for a size or the like of the body of a user with a size measuring system in accordance with the first embodiment of the present invention.
Figure 15:
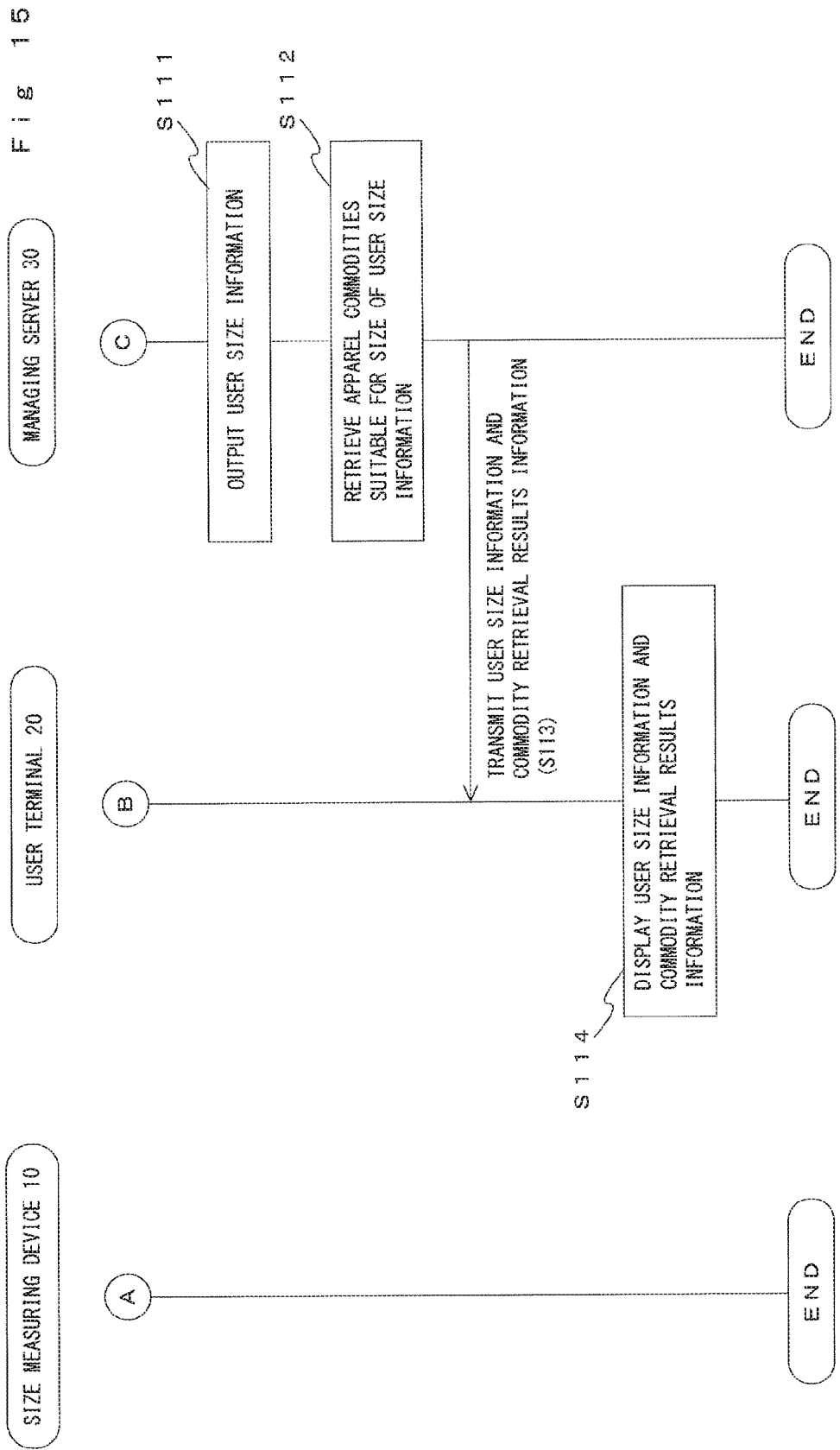
FIG. 15 is a sequence chart showing the flow of measuring operations for a size or the like of the body of a user with the size measuring system in accordance with the first embodiment of the present invention.

FIG. 14 and FIG. 15 show a sequence chart indicating the flow of measuring operations of the size or the like of a body of a user with the size measuring system in accordance with the first embodiment of the present invention.

Referring to the drawings, explanations will be given on the measuring operations.

First, a user puts on a tights-shaped size measuring device 10 to wear it on the lower body of himself or herself (step S101).

Next, the user operates a predetermined switch (not shown) of the size measuring device 10 to turn it ON (step S102) so that short-distance wireless communication between the size measuring device 10 and the user terminal 20 is established (step S103).

With respect to the establishing method for the short-distance wireless communication, since any conventional technique may be used, the detailed description thereof will be omitted.

When the short-distance wireless communication is established between the size measuring device 10 and the user terminal 20, the user next operates the operation part 25 of the user terminal 20 to input a measurement start instruction (step S104).

Then, the user terminal 20 transmits a measuring start request to the size measuring device 10 (step S105).

Upon receipt of the measuring start request from the user terminal 20, the size measuring device 10 measures the value of electrostatic capacitance of each of the measuring sensors, with the user wearing the size measuring device 10 (step S106), and transmits the measured values to the user terminal 20 as the sensor measurement information (step S107).

Upon receipt of the above-mentioned sensor measurement information (measured value of electrostatic capacitance), the user terminal 20 transmits the received sensor measurement information to the managing server 30 (step S108).

When the managing server 30 has received the sensor measurement information from the user terminal 20, the control part 31 of the managing server 30 registers the received sensor measurement information in the sensor measurement DB321, and also refers to a measurement conversion DB322 so as to convert the received sensor measurement information to sensor size information corresponding to a length value of each of the measuring sensors when the size measuring device 10 is attached to the user (step S109).

The control part 31 of the managing server 30 registers the sensor size information indicating the value of the converted length in the sensor measurement DB321.

Next, the control part 31 of the managing server 30 determines cylinder coordinates of each of the nodes of the size measuring device 10 based upon the values of the respective measuring sensors obtained by the above-mentioned conversion (step S110).

Next, the control part 31 refers to the user measurement DB325 and detects distances between the respective nodes based upon the cylinder coordinates of the respective nodes determined as described above, and outputs these as user size information representing the respective sizes of the user's body (step S111).

Next, the control part 31 refers to the commodity DB326, and retrieves apparel commodities suitable for the values of the outputted user size information (body sizes of the user) (step S112).

For example, the control part 31 of the managing server 30 retrieves apparel commodities whose converted user size information of the measuring sensors is included within the retrieval range of the commodity size information as the retrieval method for the apparel commodities.

Next, the managing server 30 transmits the commodity retrieval results information representing the retrieval results and the user size information to the user terminal 20 (step S113).

Upon receipt of the commodity retrieval results information and the user size information, the user terminal 20 displays the information on the display part 24 (step S114).

For example, as the contents of the commodity retrieval results information displayed on the display part 24 of the user terminal 20, detailed information, such as a list of the apparel commodities whose user size information is suitably included within the retrieval range, prices, makers and images, etc., is displayed.

Moreover, in the commodity retrieval results information, a URL of a Web page of an online shop for purchasing the displayed apparel commodity is embedded so that when an icon or a URL on the commodity retrieval results information is clicked or the like, the user terminal 20 transmits an acquisition request for the Web page for purchasing the corresponding apparel commodity to a Web server (or the managing server 30 may be used), and upon receipt of the corresponding page from the Web server, the page is displayed, and thereafter, the corresponding apparel commodity can be purchased on the online shop.

After the above-mentioned processes, the operations are completed.

(2) Determination Operations of Cylinder Coordinates of Nodes

Next, the following description will explain determination processes of cylinder coordinates of the nodes in the above-mentioned step S110 in more detail.

(Determination Algorithm of Cylinder Coordinates of Nodes)

The information storage part 32 of the managing server 30 stores a program on which an algorithm for carrying out determination processes of cylinder coordinates of the above-mentioned nodes is described.

In the corresponding algorithm, pieces of information as to which another measuring sensor each of the measuring sensors is installed adjacent to (positional relationship between the measuring sensors), as to which nodes are positioned on the two ends of the belt-shaped measuring sensor (positional relationship between the measuring sensor and the nodes) and as to relative positions between each of a plurality of different cylinder models and the reference node (positional relationship of the reference node) are preliminarily described.

Moreover, in the corresponding algorithm, pieces of information as to which measuring sensor and node each of the ring units is constituted by (constituent elements of the ring unit) and as to which ring unit forms the reference ring unit (specification of the reference ring unit) are also preliminarily described.

By using the corresponding algorithm, the control part 31 of the managing server 30 carries out determination processes of the cylinder coordinates of the nodes.

Additionally, the contents of the algorithm explained in the present embodiment are exemplary only, and another algorithm may be used upon determining the coordinate information of the nodes.

(Explanation of Cylinder Coordinates)

Cylinder coordinates are proposed as one system of spatial coordinates.

The cylinder coordinates are indicated by three parameters of the height, angle and radius.

In the present embodiment, when the height, angle and radius of the cylinder coordinates are individually denoted, these are supposed to be respectively denoted as cylinder coordinates (height), cylinder coordinates (angle) and cylinder coordinates (radius).

Figure 16:
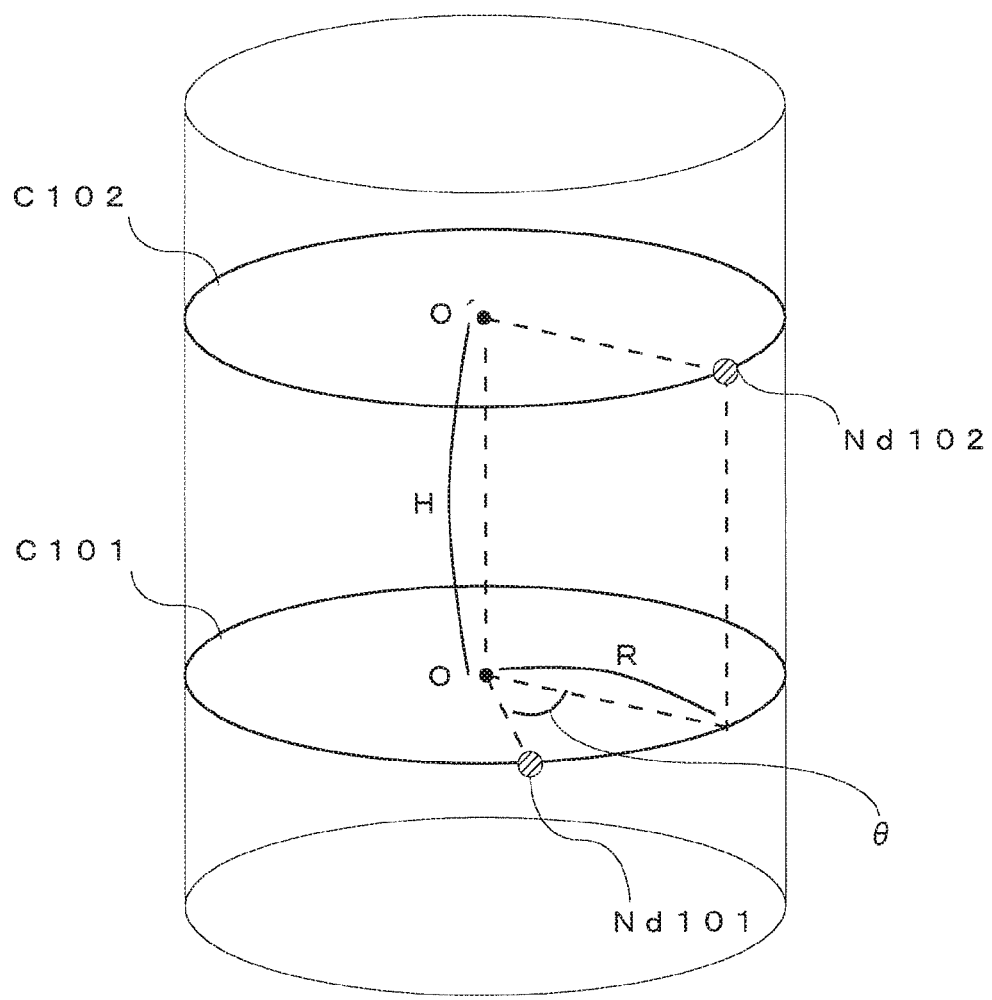
FIG. 16 is a view showing a general notation method for cylinder coordinates in accordance with the first embodiment of the present invention.

FIG. 16 is a view showing a general notation method of cylinder coordinates in accordance with the first embodiment of the present invention.

The following description will explain the notation method of the cylinder coordinates by exemplifying nodes Nd101 and Nd102.

First, the notation method of the cylinder coordinates of the node Nd101 in the drawing will be explained.

In the drawing, supposing that the center of a circle C101 forming the bottom surface serving as the reference of the cylinder coordinates is 0, and the cylinder coordinates (height, angle, radius) thereof are set to (0, 0, 0). Moreover, the length of the radius of the circle C101 is set to R.

The node Nd101 is disposed on the circumference of the circle C101. Supposing that the cylinder coordinate (angle) of the node Nd101 is 0, the cylinder coordinates (height, angle, radius) of the node Nd101 are denoted as (0, 0, R).

Next, the notation method of the cylinder coordinates of the node Nd102 in the drawing will be explained.

In the drawing, the cylinder coordinates (height, angle, radius) of the center O' of a circle C102 are set to (H, 0, 0), and the length of the radius is R. The circle C102 is a concentric circle of the circle C101.

On the circumference of the circle C102, the node Nd102 is disposed. In this case, supposing that an angle made by a line segment connecting O' and node Nd102 with each other and a line segment connecting O and node Nd101 with each other is θ, the cylinder coordinates of the node Nd102 are denoted as (H, θ, R).

By using the above-mentioned notation method of cylinder coordinates, the following description will explain determination processes of the cylinder coordinates of the nodes in the present embodiment.

Additionally, the determination processes of the cylinder coordinates of the nodes are supposed to be carried out by the control part 31 of the managing server 30.

(Determination Processes of Cylinder Coordinates of Reference Node)

Figure 17:
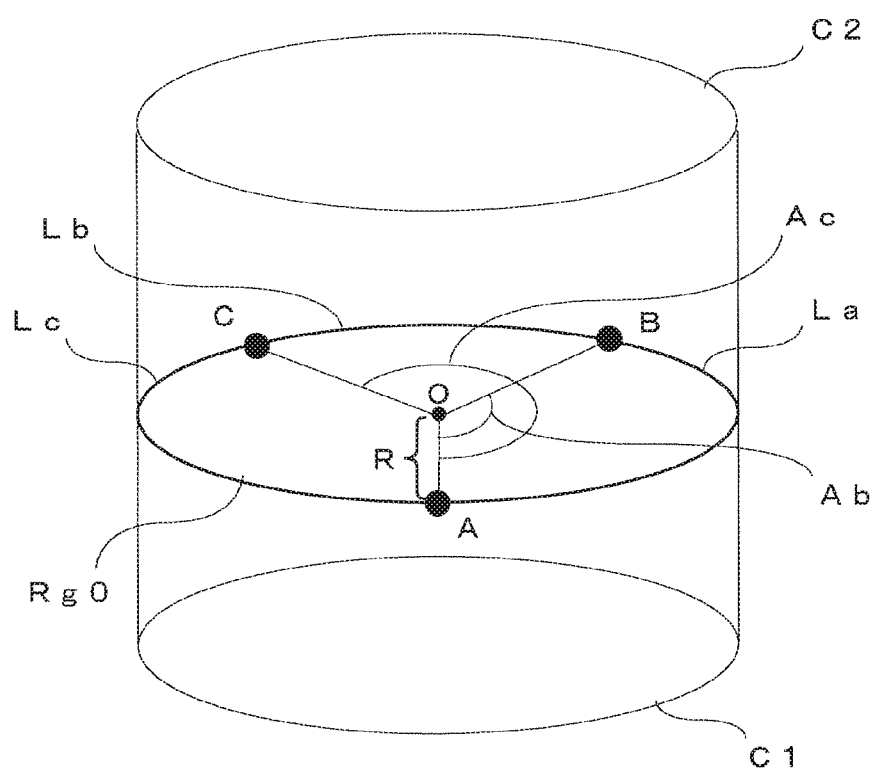
FIG. 17 is a view for explaining a determination process of cylinder coordinates of a reference node in accordance with the first embodiment of the present invention.

FIG. 17 is a view for explaining determination processes of cylinder coordinates of a reference node in accordance with the first embodiment of the present invention.

Referring to the drawing, the following description explains the determination processes of the cylinder coordinates of the reference node.

In FIG. 17, points A, B and C respectively show the positions of the reference nodes Na, Nb and Nc.

A circle ABC represents a circle on the circumference of which the points A, B and C are located, and a reference ring unit Rg0 is schematized. The reference ring unit Rg0 is constituted by the reference nodes Na, Nb and Nc as well as measuring sensors Sa, Sb and Sc.

The cylinder coordinates of the center O of the circle ABC are set to (0, 0, 0), and the length of the radius is represented by R.

Moreover, circles C1 and C2 are circles hypothetically drawn for explanation, which are congruent and concentric circles with the circle ABC (circle ABC, circles C1 and C2 are in parallel with one another).

The circumference of the circle ABC is constituted by arcs AB, BC and CA that are coupled to one another, and lengths La, Lb and Lc of the respective arcs AB, BC and CA are represented by the lengths (measured values) of the respective sensors Sa, Sb and Sc.

Next, the following description will explain a method in which the control part 31 indicates the coordinates of points A, B and C by using cylinder coordinates (height, angle, radius).

The cylinder coordinate (height) indicates a height from the reference plane, and the circle ABC is supposed to be positioned on the reference plane. That is, the cylinder coordinate (height) of each of the circles A, B and C is 0.

The cylinder coordinate (angle) indicates a center angle made by a radius passing through the reference point on the circumference in the circle ABC and a radius passing through each of the points A, B and C, and the corresponding reference point is supposed to be point A. Thus, the cylinder coordinates (angle) of the point A is set to 0.

The cylinder coordinate (radius) is represent by R since each of the points A, B and C is positioned on the circumference of the circle ABC having the radius R.

As described above, supposing that the cylinder coordinates (angle) of the reference nodes Nb and Nc are Ab and Ac, the control part 31 determines the cylinder coordinates of the reference nodes Na, Nb and Nc (points A, B and C) in the following manner.

Cylinder coordinates of reference node Na (point A): (0, 0, R)

Cylinder coordinates of reference node Nb (point B): (0, Ab, R)

Cylinder coordinates of reference node Nc (point C): (0, Ac, R)

As described above, since the lengths La, Lb and Lc of the arcs AB, BC and CA correspond to the lengths of the respective measuring sensors Sa, Sb and Sc, the control part 31 can determine the lengths of the arcs AB, BC and CA based upon the values of electrostatic capacitance of the respective measuring sensors Sa, Sb and Sc.

Moreover, since the circumference of the circle ABC is represented by the sum of the lengths of the arcs AB, BC and CA, and since the radius can be found by the circumference, the control part 31 determines the radius R of the circle ABC in the following manner.

Radius R of circle ABC (reference ring unit Rg0)=[(La+Lb+Lc)/2π]

Next, the control part 32 determines the Ab and Ac of cylinder coordinate (angle) at points B and C in the following manner.

Cylinder coordinate (angle) Ab of reference node Nb (point B)=[2π·(La+Lb)/(La+Lb+Lc)]

Cylinder coordinate (angle) Ac of reference node Nc (point C)=[2π·(La+Lb)/(La+Lb+Lc)]

As described above, since the lengths La, Lb and Lc of the arcs AB, BC and CA are determined by lengths calculated from the electrostatic capacitance of each of the measuring sensors Sa, Sb and Sc, the control part 31 can determine the radius R of the circle ABC and the cylinder coordinate (angle) Ab, Ac of the reference nodes Nb and Nc. Thus, the control part 31 can determine all the cylinder coordinates of the points A, B and C, that is, the reference nodes Na, Nb and Nc.

(Determination Processes of Cylinder Coordinates of Other Nodes)

Figure 18:
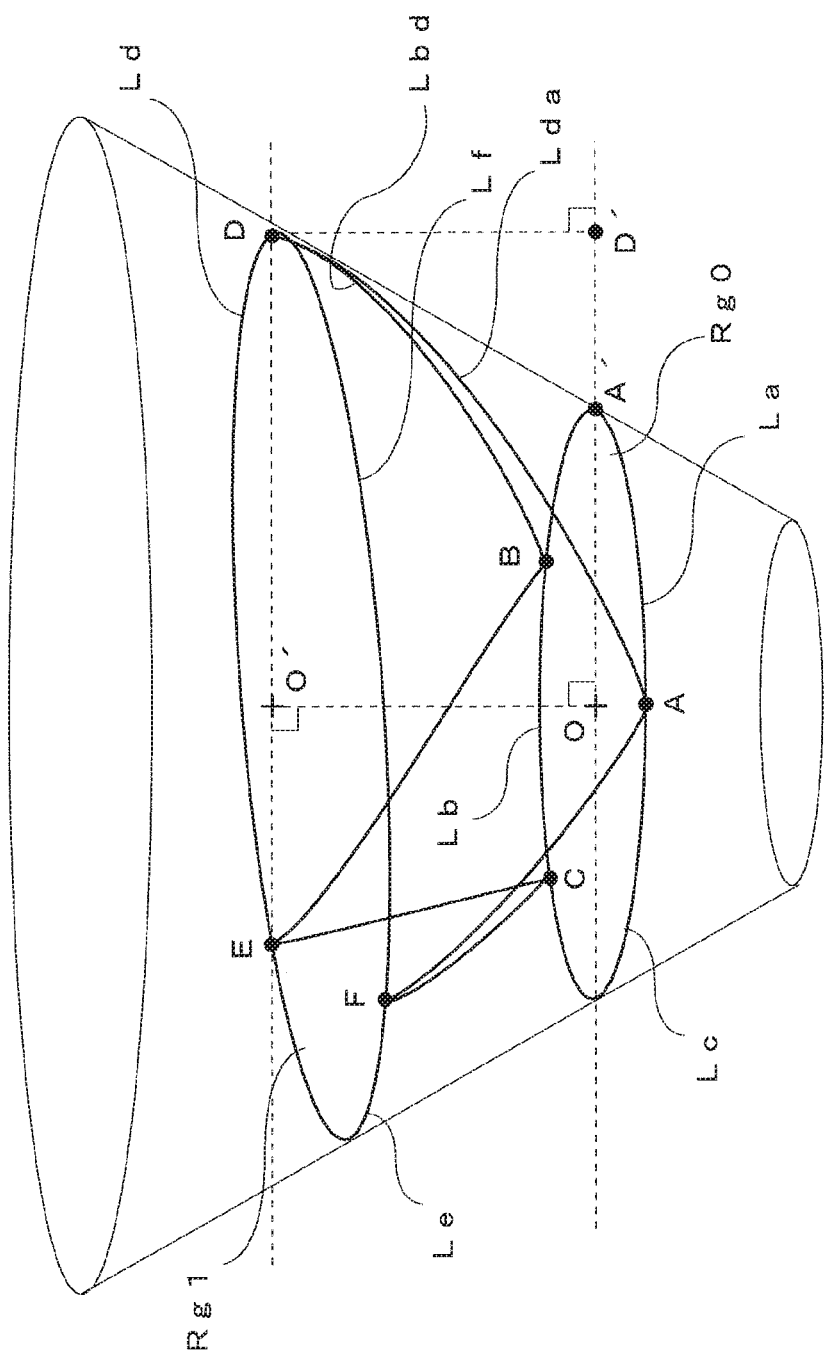
FIG. 18 is a view for explaining a determination process of cylinder coordinates of other nodes in accordance with the first embodiment of the present invention.

FIG. 18 is a view for explaining determination processes of cylinder coordinates of other nodes in accordance with the first embodiment of the present invention.

Referring to the drawing, the following description explains the determination processes of the cylinder coordinates of nodes forming other ring units adjacent to the reference ring unit, which are executed by the control part 31 of the managing server 30 after the determination processes of the cylinder coordinates of the reference node.

In FIG. 18, in the same manner as in FIG. 17, the points A, B and C indicate the positions of the respective reference nodes Na, Nb and Nc.

In the same manner as in FIG. 17, the circle ABC indicates a circle on the circumference of which the points A, B and C are located, which is formed by schematizing the reference ring unit Rg0.

As described above, the ring unit Rg0 forms a reference ring unit as the reference at the time of obtaining coordinates of the respective nodes of the body measuring device 10, and the cylinder coordinates of the respective nodes Na, Nb and Nc forming its own ring unit are determined as described in the section of (Determination Processes of Cylinder Coordinates of Reference Node).

Points D, E and F respectively show the positions of the respective nodes Nd, Ne and Nf.

A circle DEF represents a circle on the circumference of which the points D, E and F are located, which is formed by schematizing a ring unit Rg1 adjacent to the reference ring unit Rg0. The ring unit Rg1 is constituted by the nodes Nd, Ne and Nf as well as measuring sensors Sd, Se and Sf.

The cylinder coordinates of the center O of the circle ABC are set to (0, 0, 0), and the length of the radius is represented by R.

Moreover, circles C3 and C4 are circles hypothetically drawn for explanation, which are congruent and concentric circles with the circle ABC (circle ABC, circles C3 and C4 are in parallel with one another).

The circumference of the circle DEF is constituted by arcs DE, EF and FD coupled to one another, and the lengths Ld, Le and Lf of each of the arcs DE, EF and FD indicate the lengths (measured values) of the respective measuring sensors Sd, Se and Sf.

In this case, the cylinder coordinates (height, angle, radius) of the points D, E and F are represented in the following manner.

Cylinder coordinates of point D (Hd, Ad, Lrd)
Cylinder coordinates of point E (He, Ae, Lre)
Cylinder coordinates of point F (Hf, Af, Lrf)

Height represents a height from the reference plane.

(Determination Processes of Cylinder Coordinate of Node Nd)

Next, the following description will explain determination processes of cylinder coordinates of the node Nd among nodes forming the ring unit Rg1.

In FIG. 18, from a point D downward to a reference plane on which the circle ABC is positioned, a perpendicular line is drawn, and an intersection (downward tip of perpendicular line) between the perpendicular line and the reference plane is set to a point D'.

On the reference plane, a line segment OD' is drawn and the intersection between the corresponding line segment OD' and the circle ABC is set to a point A'.

The cylinder coordinates of the point A' are represented by (0, Ad, R).

An intersection between a perpendicular line on the circle ABC passing through the point O and a straight line passing through the point D in parallel with the straight line OA' is set to a point O'.

The cylinder coordinates of the point O' are represented by (Ho, 0, 0). Moreover, when a distance between the point O' and the point D is set to Lo'd, the cylinder coordinates of the point D' are indicated as (0, Ad, Lo'd).

Furthermore, the cylinder coordinates of the point D are represented by (Ho, Ad, Lrd).

As shown in FIG. 18, the point A' is located on the arc AB. By connecting the point A' to the point D, a line segment DA' is drawn.

Figure 19:
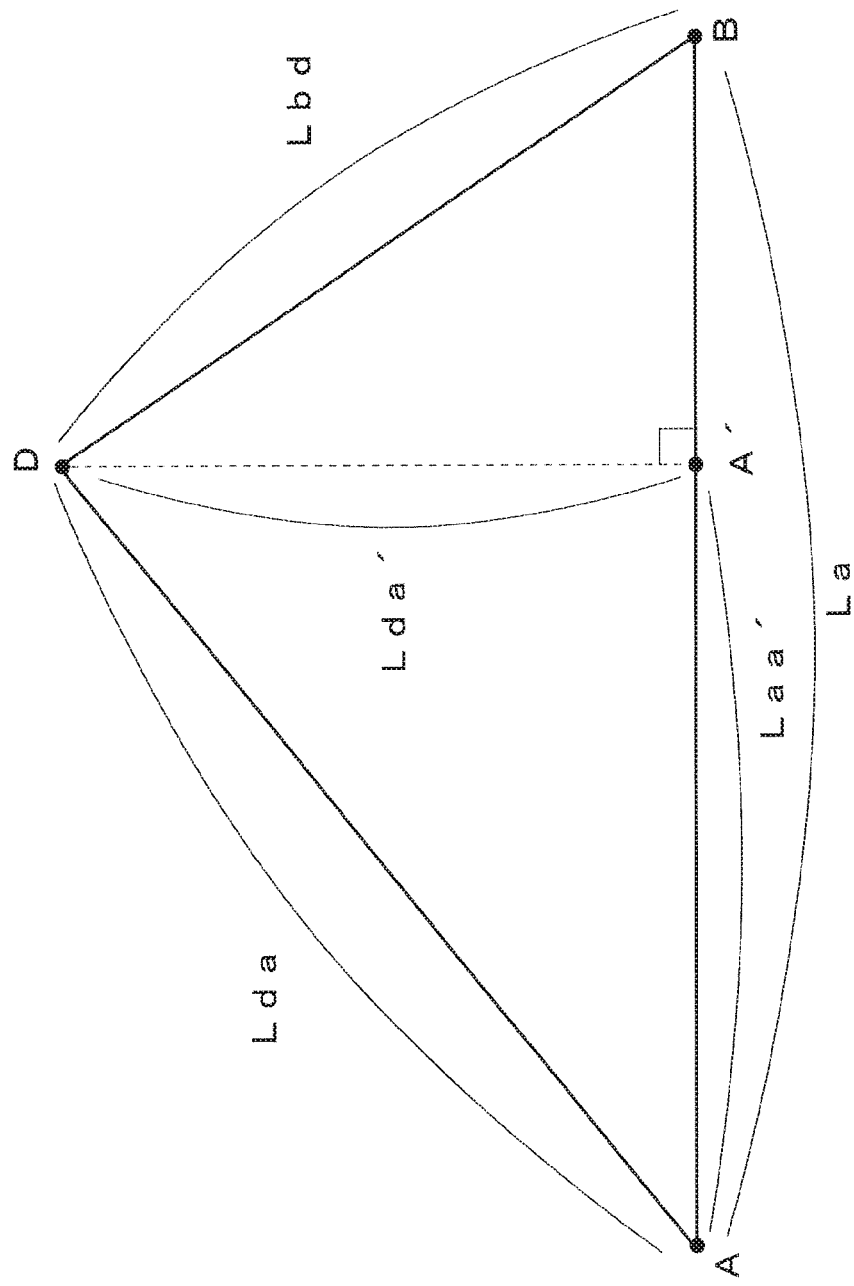
FIG. 19 is a development plan view showing a triangle ABD in accordance with the first embodiment of the present invention.

FIG. 19 is a development plan view showing a triangle ABD with the points A, B and D serving as its apexes in accordance with the first embodiment of the present invention.

Of the triangle ABD, the side AB is obtained by developing the arc AB.

On the triangle ABD, an intersection between a perpendicular line drawn from the apex D toward the side AB and the side AB corresponds to the point A'.

The length of the line segment DA' is set to Lda', and the lengths of the sides AB, BD and DA are respectively set to La, Lbd and Lda.

When Heron's formula is applied to the triangle ABD, the following equation is obtained.

$$Lda'=2\sqrt{\{s(s-La)(s-Lbd)(s-Lda)\}}/La$$

In the above-mentioned equation, the inside of { }(brace) corresponds to the inside of the root.

In this case, s=(La+Lbd+Lda)/2 holds.

In the control part 31 of the managing server 30, since the respective lengths La, Lbd, Lda of the arcs AB, BD, DA can be determined by lengths calculated by electrostatic capacitance of the respective sensors Sa, Sbd, Sda, the control part 31 can determine the length Lda' of the above-mentioned line segment DA'.

The length Laa' of the line segment AA' is obtained by the Pythagorean theorem as shown below.

$$(Laa')^2+(Lda')^2=(Lda)^2$$

As described above, the control part 31 can determine Lda based upon the value of electrostatic capacitance of the measuring sensors, and moreover, the control part 31 can also determine Lda' by Heron's formula as described above.

Therefore, the control part 31 can determine Laa' based upon the above-mentioned Pythagorean theorem.

Since the control part 31 can determine Laa' as described above, and since it can also determine La from the value of electrostatic capacitance of the measuring sensor, it can determine the ratio between the lengths of Laa' and La.

Therefore, the control part 31 can determine an angle made by the radius OA and the radius OA' in the circle ABC based upon the above-mentioned ratio, that is, Ad of the cylinder coordinate (angle) of the point D.

Next, the cylinder coordinate (height) of the point D is found.

Figure 20:
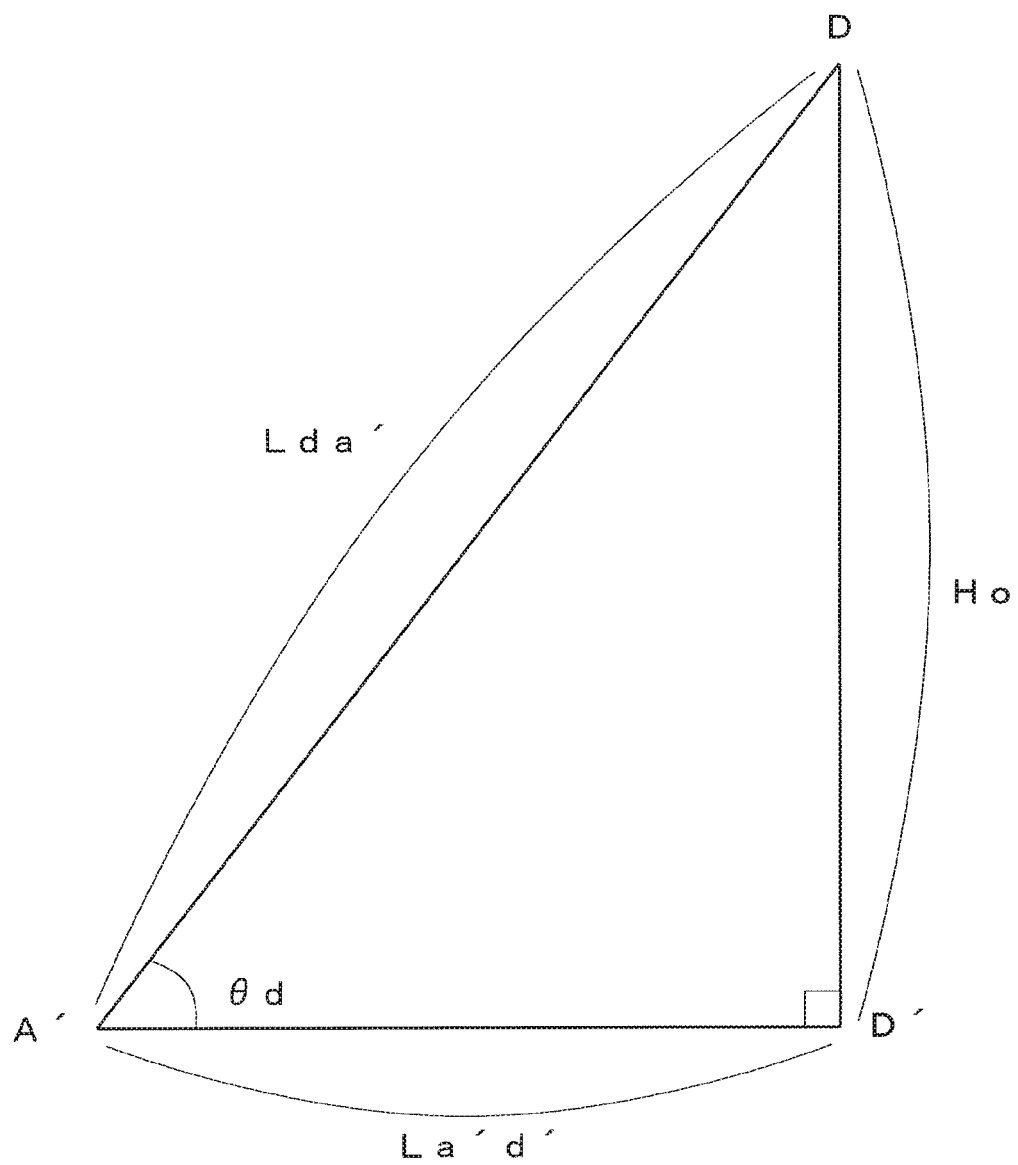
FIG. 20 is a view showing a triangle A'DD' in accordance with the first embodiment of the present invention.

FIG. 20 is a view showing a triangle A'DD' in accordance with the first embodiment of the present invention.

In the drawing, supposing that an angle ∠DA'D' is θd, the height Hd=Ho of the cylinder coordinates of the point D is represented by the following manner.

$$Hd=Ho=Lda'\times\sin(\theta d)$$

Moreover, the length La'd' of the line segment A'D' can be shown in the following manner.

$$La'd'=Lda'\times\cos(\theta d)$$

Furthermore, supposing that the length of the line segment OA' is Loa', since Lrd=Loa'+La'd' holds, the cylinder coordinates (radius) Lrd of the point D can be represented as shown below.

$$Lrd=R(\text{radius of circle ABC})+Lda'\times\cos(\theta d)$$

From the above description, among the cylinder coordinates (height, angle, radius)(Hd, Ad, Lrd) of the point D, the cylinder coordinate (angle) Ad can be determined by the control part 31 as described above, and the cylinder coordinate (height) Hd and the cylinder coordinate (radius) Lrd can be indicated by using θd.

(Determination Processes of Cylinder Coordinates of Node Ne)

As described above, with respect to the cylinder coordinates of the node Nd (point D), the angle is determined by using the triangle ADB, and the height and radius are represented by using θd.

With respect to the node Ne (point E), by using a triangle BCE, cylinder coordinates (He, Ae, Lre) can be determined or represented by using Oe to be described later, in the same method as in the case of the node Nd.

The following description will explain determination processes of the cylinder coordinates of the node Ne.

Figure 21:
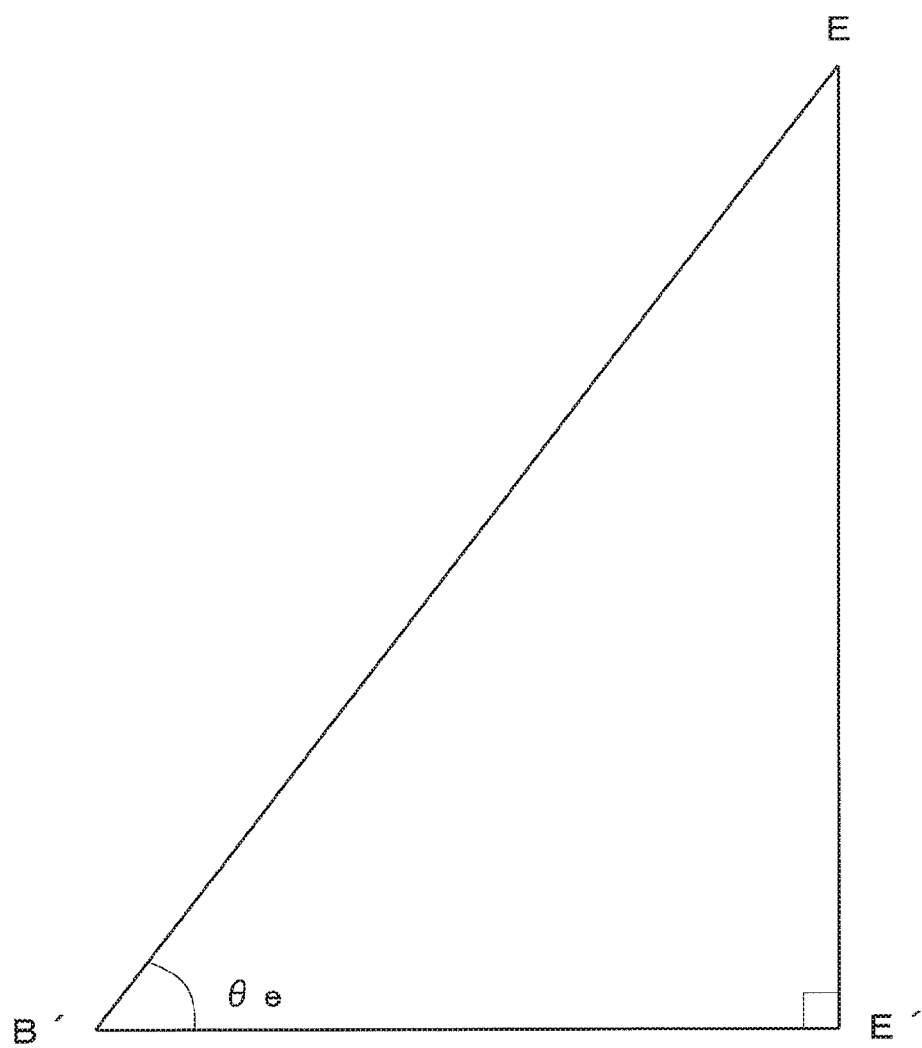
FIG. 21 is a view showing a triangle B'EE' in accordance with the first embodiment of the present invention.

FIG. 21 is a view showing a triangle B'EE' in accordance with the first embodiment of the present invention.

In the view, from E downward to a reference plane, a perpendicular line is drawn, and an intersection between the perpendicular line and the reference plane is set to E'.

Moreover, on the reference plane, a line segment OE' is drawn, and an intersection between the corresponding line segment OE' and the circle ABC is set to B.

An angle <EB'E' is set to θe.

In this case, with respect to the node Ne also, the control part 31 can determine the cylinder coordinate (angle) Ae in the same manner as in the case of the node Nd, and the cylinder coordinate (height) He and the cylinder coordinate (radius) Lre can be represented by using θe.

(Determination Processes of Cylinder Coordinates of Node Nf)

As described above, with respect to the cylinder coordinates of each of the nodes Nd and Ne, the angle is determined, and the height and radius can be represented by respectively using θd and θe.

With respect to a node Nf (point F) also, by using a triangle CAF, cylinder coordinates (Hf, Af, Lrf) can be determined or represented by using θf to be described later, in the same method as in the case of the nodes Nd and Ne.

Figure 22:
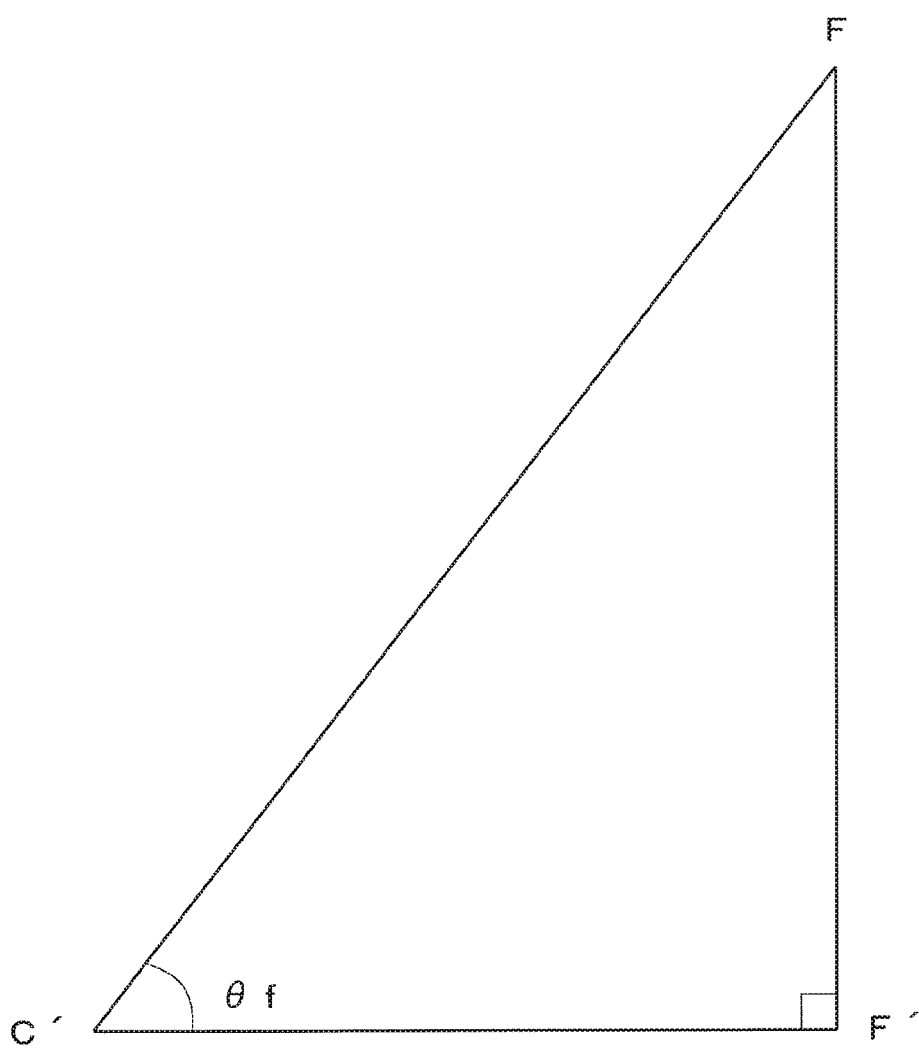
FIG. 22 is a view showing a triangle C'FF' in accordance with the first embodiment of the present invention.

FIG. 22 is a view showing a triangle C' FF' in accordance with the first embodiment of the present invention.

In the drawing, from F downward to a reference plane, a perpendicular line is drawn, and an intersection between the perpendicular line and the reference plane is set to F'.

Moreover, on the reference plane, a line segment OF' is drawn, and an intersection between the corresponding line segment θF' and the circle ABC is set to C'.

An angle ZFC'F' is set to θf.

In this case, with respect to the node Nf also, the control part 31 can determine the cylinder coordinate (angle) Af in the same manner as in the case of the nodes Nd and Ne, and the cylinder coordinate (height) Hf and the cylinder coordinate (radius) Lrf can be represented by using θf.

(Determination Processes of Cylinder Coordinates of Nodes Nd, Ne, Nf)

As described above, with respect to the cylinder coordinates of each of the nodes Nd, Ne and Nf, the angle is determined, and the height and radius are represented by respectively using θd, θe and θf.

As described above, in the present embodiment, by replacing a waist portion and two leg portions of the size measuring device 10 having a tights shape with cylinder models, cylinder coordinates of nodes disposed on the waist portion and two leg portions are determined.

When the user attaches the size measuring device 10 to his or her body so as to measure the sizes, the radius of each of the ring units in each of the cylinder models tends to take different values, such as a large or small value in comparison with that of the adjacent ring unit; however, because of the inherent structure of a human body, among a plurality of nodes forming one ring unit, only the specific node does not protrude extremely in a radial direction of the ring unit.

Based upon this fact, in the cylinder models in the present embodiment, with θd=θe=θf=θ being satisfied, the control part 31 makes it possible to determine the cylinder coordinate (height) and cylinder coordinate (radius) of the nodes Nd, Ne and Nf by using the common parameter θ.

Figure 23:
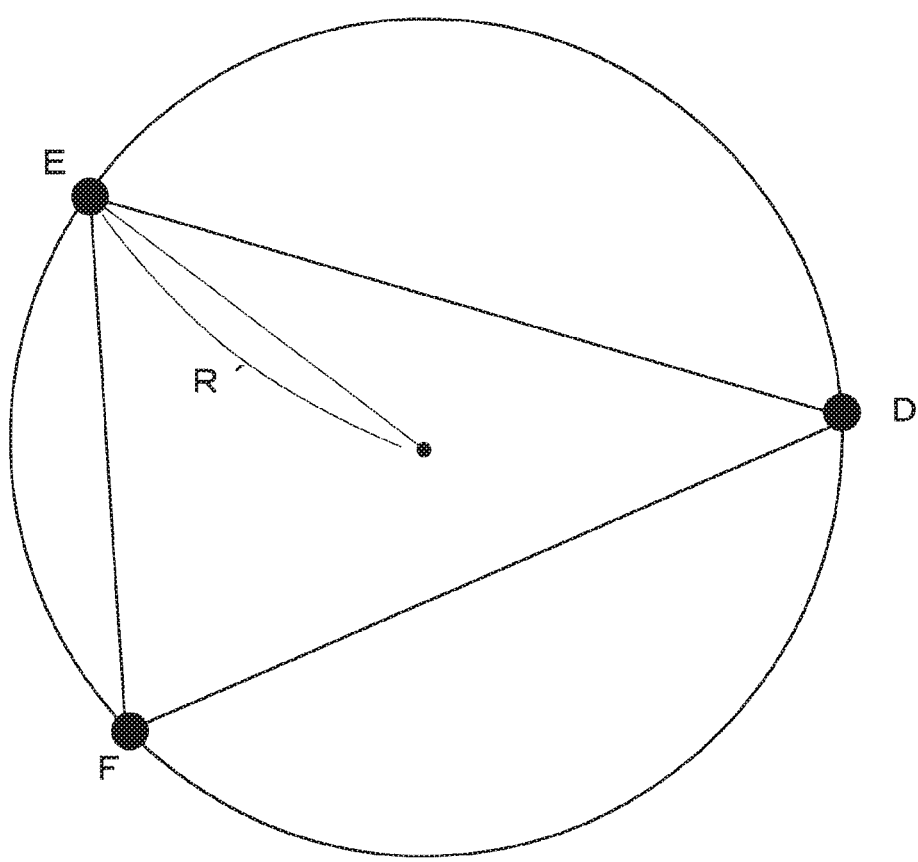
FIG. 23 is a view showing a ring unit Rg1 in accordance with the first embodiment of the present invention.

FIG. 23 is a view showing the ring unit Rg1 in accordance with the first embodiment of the present invention.

In the drawing, points D, E and F are positioned on the circumference of the same circle DEF.

Here, by illustrating a triangle DEF, the lengths of the respective sides DE, EF and FD are obtained.

As the method for obtaining the lengths of the respective sides DE, EF and FD, various methods are proposed, and for example, after the cylinder coordinates of the points D, E and F have been converted to orthogonal coordinates, the lengths can be obtained by using a formula relating to a distance between two points in a three-dimensional space, as described below. (distance between two points=$\sqrt{\{(x2-x1)^2+(y2-y1)^2+(z2-z1)^2\}}$)

In this case, (x1, y1, z1), (x2, y2, z2) represent orthogonal coordinates between two points, and the inside of braces { } corresponds to the inside of the root.

When the above-mentioned formula relating to a distance between two points is used, the lengths of the respective sides DE, EF, FD can be respectively represented by using θ.

The circumscribed circle of the triangle DEF is a circle DEF, and the circumference of the circle DEF is a total value of the arcs DE, EF and FD.

Moreover, based upon the value of electrostatic capacitance measured by each of the measuring sensors Sd, Se and Sf, the respective lengths of the arcs DE, EF and FD can be determined.

Therefore, since the control part 31 can determine the circumference of the circumscribed circle (circle DEF), it can also determine the radius R' of the corresponding circumscribed circle.

Supposing that the lengths of the three sides of the triangle are a, b and c, and that the radius of the circumscribed circle of the corresponding triangle is R', the radius R' of the circumscribed circle can be obtained by the following formula. R'=(abc)/[$\sqrt{\{(a+b+c)(b+c-a)(c+a-b)(a+b-c)\}}$]

In this case, the inside of braces { } corresponds to the inside of the root.

By substituting the lengths of the respective sides DE, EF and FD represented by using the aforementioned θ in a, b and c of the formula of the radius of the circumscribed circle, the control part 31 can determine θ because the radius R' has been determined based upon the measured values of the measuring sensors Sd, Se and Sf as described above.

Since θ has been determined, the control part 31 can also determine the cylinder coordinate (height) and cylinder coordinate (radius) of each of the points D, E and F represented by using the corresponding value θ.

As described above, the control part 31 of the managing server 30 can determine the cylinder coordinates of the node forming the ring unit adjacent to the reference ring unit.

By repeatedly executing the determination processes of the cylinder coordinates of the node in the adjacent ring unit, the control part 31 can determine the cylinder coordinates of all the nodes inside the cylinder model.

Moreover, as described above, since relative positions among the reference nodes of the plural different cylinder models are described in the determination algorithm of the cylinder coordinates of the node, the control part 31 can determine the relative positions among the nodes of different cylinder models by using the corresponding algorithm.

That is, the control part 31 determines the cylinder coordinates of all the nodes in a measuring object (such as a human body or the like) that is substituted by a plurality of cylinder models.

In this manner, the body size and body type of the user wearing the size measuring device 10 can be easily confirmed.

(3) Supplying Operations of Virtual Fitting Image

As described above, the managing server 30 transmits commodity retrieval results information indicating information of apparel commodities suitable for the body size and body type of the user to the user terminal 20.

Moreover, the user can receive the virtual fitting images of commodities shown in the corresponding commodity retrieval results information.

Figure 24:
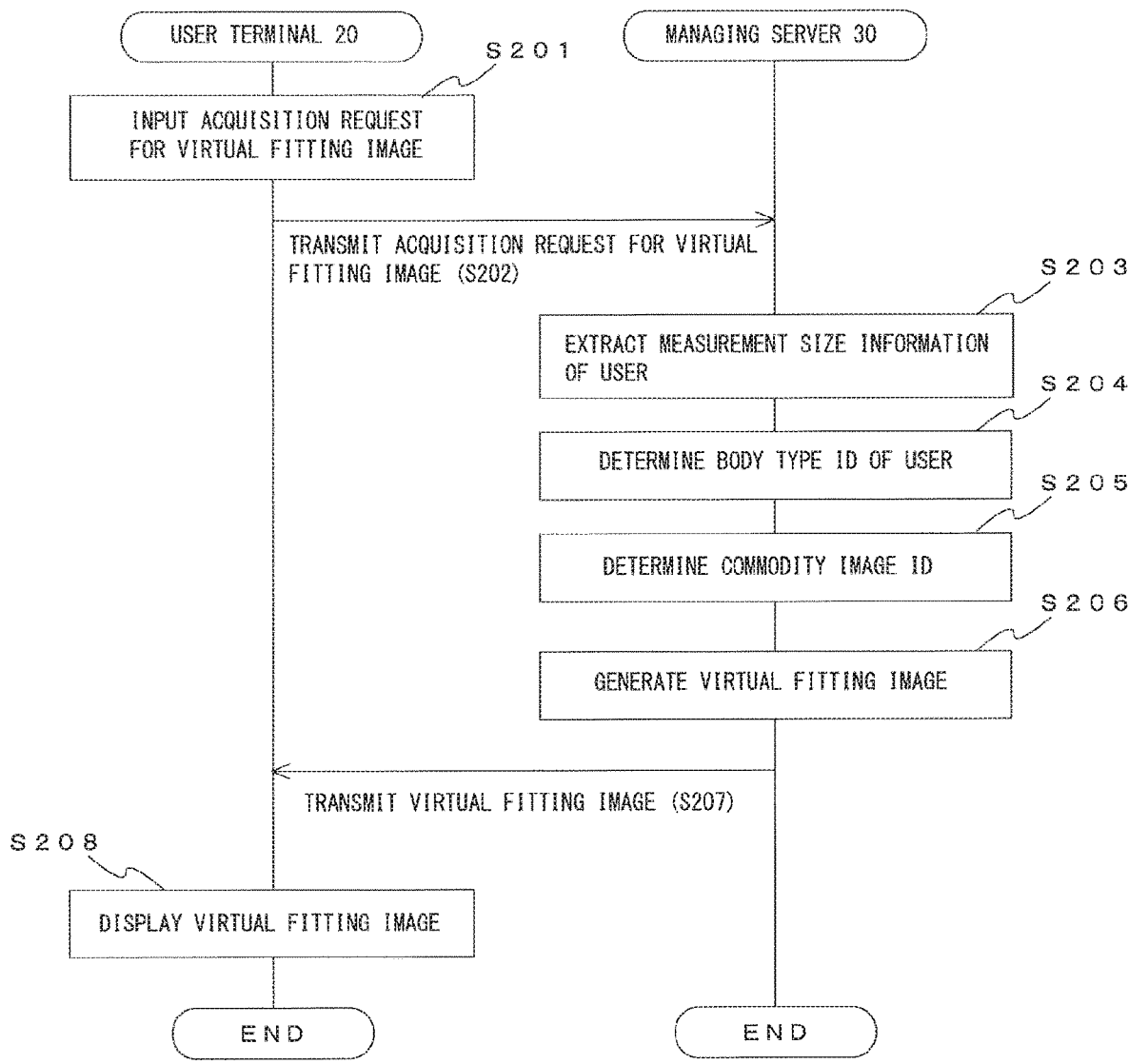
FIG. 24 is a sequence chart showing a flow of supplying operations of a virtual fitting image in accordance with the first embodiment of the present invention.

FIG. 24 shows a sequence chart showing a flow of supplying operations of the virtual fitting image in accordance with the first embodiment of the present invention.

Referring to the drawing, the following description will explain the supplying operations of the virtual fitting image by the size measuring system.

When the user terminal 20 displays the commodity retrieval results information (step S114), the user inputs an acquisition request for the virtual fitting image of the commodity being shown in the corresponding commodity retrieval results information by using the operation part 25 of the user terminal 20 (step S201).

The user terminal 20 transmits the inputted acquisition request for the virtual fitting image to the managing server 30 (step S202).

The acquisition request for the virtual fitting image includes the corresponding user ID and commodity ID.

Upon receipt of the acquisition request for the virtual fitting image by the managing server 30, the control part 31 of the managing server 30 refers to the user measurement DB325, and based upon the user ID included in the acquisition request, extracts user size information of the corresponding user (step S203).

Next, the control part 31 refers to the body type image DB327, and based upon the extracted user size information of the user, determines a body type ID of the corresponding body type (step S204).

Next, the control part 31 refers to the commodity image DB328, and based upon the extracted body type ID and the commodity ID included in the acquisition request for the virtual fitting image, determines a commodity image ID corresponding to the two IDs (step S205).

Next, the control part 31 extracts a human body image that is made associated with the determined body type ID and a commodity image that is made associated with the determined commodity image ID from the information storage part 32, and by composing the two images with each other to generate a virtual fitting image (step S206).

The managing server 30 transmits the virtual fitting image thus generated to the user terminal 20 (step S207).

Upon receipt of the virtual fitting image from the managing server 30, the user terminal 20 displays the received virtual fitting image on the display part 24 (step S208).

The body type of a person displayed on the virtual fitting image is coincident with the body type of the user, and since the commodity image has its wrinkled state or the like very close to a state in which the user actually wears the commodity, the user can easily image the corresponding commodity and easily take it into consideration the purchase of the commodity.

The above-mentioned human body image and commodity image may be plane images or three-dimensional images.

Moreover, as described above, the generation process of the virtual fitting image is carried out by composing a human body image with a commodity image; however, the image processing method at the time of composing the images is not particularly limited.

At the time of composing the human body image with the commodity image, the images may be enlarged or reduced as appropriate, or hues or light conditions thereof may be adjusted.

As described above, in the present embodiment, in the information storage part 32 of the managing server 30, human body images for each of many patterns of body types, such as a thin body type, an athlete body type, a fat body type, or the like, are stored, and the body type image DB327 manages the human body images for each of the body types.

In the information storage part 32, only a single human body image is stored, and the control part 31 extracts user size information of the user from the user measurement DB325, and based upon the user size information thus extracted, respective portions of the above-mentioned human body image may be reduced or enlarged so as to be adjusted into a human body image that fits to the body type of the user.

For example, with respect to images of the waist portion of the human body image, the control part 31 enlarge or reduces the size of the waist portion of the human body image in accordance with the ratios between the size of the waist in the user size information and the other sizes so that the human body image is deformed.

With respect to another body portion as well, the control part 31 partially enlarges or reduces the human body image based upon the size ratios for each of the body portions.

[4] Summary of First Embodiment

As described above, in accordance with the size measuring system in the first embodiment of the present invention, by a simple operation such as to wear the size measuring device 10 on his or her body as if putting tights on, the user is allowed to specify the size and shape of his or her body based upon the change amount or the like of electrostatic capacitance of each of the measuring sensors; therefore, it becomes possible to easily confirm the size of the body and body type or to retrieve any apparel commodity that fits to the size and body type.

Moreover, each of the measuring sensors of the size measuring device 10 is made of a freely expandable material; therefore, when the user takes off the size measuring device 10 as if taking off tights, its shape is restored so that the size or the like of the body can be measured any number of times.

[5] Modified Example 1 of First Embodiment
(Management of Measurement Conversion DB by User Terminal 20)
(1) Configuration of Modified Example 1 in First Embodiment In the above-mentioned first embodiment, the managing server 30 manages the measurement conversion DB322 in which the sensor measurement information (measured value of electrostatic capacitance) and the sensor size information (length) are made associated with each other, and converts the value of the electrostatic capacitance of the measuring sensor into the length.

In the present modified example, in place of the managing server 30, the user terminal 20 manages the above-mentioned measurement conversion DB.

The following description will explain the modified example 1 of the first embodiment; however, the configuration, operations or the like are supposed to be the same as those of the first embodiment, unless otherwise specified.
(2) Operations of Modified Example 1 of the First Embodiment In the present modified example, upon receipt of sensor measurement information from the size measuring device 10, the user terminal 20 refers to a measurement conversion DB stored in its terminal, and converts the value of electrostatic capacitance of each of the measuring sensors contained in the sensor measurement information into sensor size information corresponding to the value of the length, and based upon the sensor size information, generates user size information, and transmits the information to the managing server 30.

When the managing server 30 receives the user size information from the user terminal 20, the control part 31 of the managing server 30 carries out a retrieving process of apparel commodities and a generation process of a virtual fitting image based upon the received user size information.

With respect to the contents of the retrieving process of the apparel commodities and the generation process of a virtual fitting image as well as the processes carried out thereafter, since the same processes as those of the above-mentioned first embodiment are carried out, the explanation thereof will be omitted.

(3) Summary of Modified Example 1 in First Embodiment

In this manner, in the present modified example, since the user terminal 20 stores the management conversion DB and executes the conversion process to the sensor size information, in place of the managing server 30, the load of processes to be carried out by the managing server 30 can be reduced.

Additionally, in the present modified example, explanations have been given by exemplifying a process in which the user terminal 20 stores the measurement conversion DB in place of the managing server 30; however, it may store another database in place of the managing server 30, and carry out the retrieving process of apparel commodities or the generation process of a virtual fitting image.

For example, the managing server 30 carries out the retrieving process of apparel commodities, and the user terminal 20 may execute the conversion process into the sensor size information, the generation process of the user size information and the generation process of virtual fitting images in place of the managing server 30, and may also output (transmit, display or the like) the various kinds of information generated by these processes.

Alternatively, the managing server 30 carries out the conversion process into the sensor size information, the generation process of the user size information and the retrieving process of apparel commodities, and based upon the user size information received from the managing server 30, the user terminal 20 may execute the generation process of virtual fitting images in place of the managing server 30, so as to output (transmit, display or the like) the various kinds of information generated by these processes.

With respect to which database is stored by which one of the user terminal 20 and the managing server 30 so as to execute which process, the above-mentioned processes are exemplary only, and any other combination may be adopted.

[6] Modified Example 2 of First Embodiment
(Other Shape of Size Measuring Device 10)
(1) Configuration of Modified Example 2 in First Embodiment In the above-mentioned first embodiment, the size measuring device 10 has a tights shape; however, in the present modified example, it is formed into another shape such as cloths or the like other than tights.

FIG. 25(a) and FIG. 25(b) are views showing appearances of a size measuring device 10 in accordance with a second modified example of the first embodiment of the present invention.

Referring to the drawings, the following description will explain the present modified example.

As shown in FIG. 25(a), the size measuring device 10 may have a shirt shape. In the same manner as in the case of the tights shape, a plurality of measuring sensors are disposed into a triangular polygonal shape.

The size measuring device 10 having the shirt shape is divided into and substituted by three cylinder models of a trunk portion and two sleeve portions, and cylinder coordinates of nodes are determined in the same manner as in the case of the tights shape.

When the user puts this size measuring device 10 having the shirt shape on the upper body of himself or herself as if putting a shirt on, the size of the upper body is measured.

As shown in FIG. 25(b), the size measuring device 10 may have a hat shape.

In the same manner as in the case of the tights shape or shirt shape, the size measuring device 10 has a configuration in which a plurality of measuring sensors are disposed into a triangular polygonal shape.

By replacing the cylinder models with a single cylinder model, the size measuring device 10 having a hat shape determines cylinder coordinates of nodes in the same manner as in the case of the tights shape or shirt shape.

When the user puts the size measuring device 10 having a hat shape on the head of himself or herself as if putting on a hat to wear the device, the size of the head is measured.

(2) Summary of Modified Example 2 in First Embodiment

As described above, the size measuring device 10 can be used not only as the tights shape, but also as other shapes such as clothes or the like relating to the user's body, and easily measure the body size and body type of the user.

Additionally, since its measuring method is the same as that of the first embodiment, the explanation thereof will be omitted.

[7] Modified Example 3 of First Embodiment
(Measurement of Electric Resistance Value by Measuring Sensor)
(1) Outline of Modified Example 3 in First Embodiment In the first embodiment, the size measuring device 10 measures the degree of expansion of the measuring sensor based upon a change in electrostatic capacitance of each of the measuring sensors.

On the other hand, the size measuring device 10 in the modified example 3 of the first embodiment measures the expansion/contraction of the measuring sensor based upon a change in another characteristic of electrostatic capacitance of the measuring sensor, such as, in particular, an electric resistance value, so as to specify the size and shape of the user's body.

The following description will explain the modified example 3 of the first embodiment on the assumption that the same operations as those of the first embodiment are carried out, unless otherwise specified.

(2) Configuration of Modified Example 3 of First Embodiment
(Configuration of Measuring Sensor)

In the present modified example, the measuring sensor is composed of synthetic fibers that are formed by mixedly spinning conductive fibers and non-conductive fibers, and provided with expandability, and a measuring device that measures a resistance value between two ends in the expansion/contraction direction (distance-measuring direction) of the corresponding synthetic fibers.

Examples of the conductive fibers include fibers formed by carbon fibers, metal fibers (silver, copper, aluminum or the like), conductive polymer fibers containing fibers made from a conductive polymer or a conductive material (conductive filler), metal coating fibers (silver, copper, aluminum or the like), or mixtures thereof.

Examples of the non-conductive fibers include polyester-based fibers, polyurethane-based fibers, polyamide-based fibers, cotton or the like.

Additionally, metal coating fibers or fibers containing a conductive material (conductive filler) or the like may be solely used, without being mixedly spun with non-conductive fibers.

When a tension is applied to the measuring sensor to be expanded in the expansion/contraction direction, the length of the measuring sensor itself becomes longer, with the cross-sectional area in a direction perpendicular to the expansion direction being made smaller, with the result that the electric resistance is increased.

(Configuration of Managing Server 30)

In the first embodiment, the managing server 30 stores the measurement conversion DB322, and the measurement conversion DB322 manages the value of electrostatic capacitance of the measuring sensor and the value of the length thereof in association with each other.

In contrast, in the present modified example, the measurement conversion DB322 manages the electric resistance value of the measuring sensor and the value of the length thereof in association with each other.

Upon receipt of sensor measurement information including the electric resistance value of the measuring sensor from the user terminal 20, the managing server 30 refers to the measurement conversion DB322, and converts the received electric resistance value of the measuring sensor into sensor size information indicating the value of the length, and by using the sensor size information, also determines coordinate information of the node, and further generates user size information, and transmits the resulting information to the user terminal 20.

Moreover, the managing server 30 transmits commodity retrieval results information generated based upon the aforementioned user size information to the user terminal 20.

(3) Operations of Modified Example 3 of First Embodiment

In the above-mentioned measuring device, when the user wears the size measuring device 10 and the synthetic fibers are expanded, contact portions on the conductive fibers are separated from each other so that the resistance value of the synthetic fibers increases. By allowing the measuring sensor to measure the amount of increase, the degree of the expansion of the synthetic fibers can be specified.

The size measuring device 10 transmits the measured electric resistance value of the synthetic fibers to the user terminal 20 as sensor measurement information.

Upon receipt of the sensor measurement information (electric resistance value), the user terminal 20 transmits the received sensor measurement information to the managing server 30.

Upon receipt of the sensor measurement information from the user terminal 20, the managing server 30 refers to the measurement conversion DB322, and converts the electric resistance value of the measuring sensor included in the received sensor measurement information into sensor size information indicating the length value of the synthetic fibers.

Based upon the sensor size information, the managing server 30 generates user size information based upon the sensor size information, and based upon the user size information, further generates commodity retrieval results information.

Moreover, the managing server 30 transmits the user size information and commodity retrieval results information thus generated to the user terminal 20.

Upon receipt of the user size information and commodity retrieval results information from the managing server 30, the user terminal 20 displays the body size of the user or displays commodity information of apparel commodities that are suitable for the user's body size based upon the received user size information.

(4) Summary of Modified Example 3 in First Embodiment

As described above, since the size measuring system in accordance with the modified example 3 of the first embodiment of the present invention measures the electric resistance value of the measuring sensor and detects the length of the synthetic fibers provided in the measuring sensor, it becomes possible to easily specify the size and shape of the user's body in the same manner as in the case when the electrostatic capacitance value of the measuring sensor is measured.

Additionally, the size measuring device 10 may specify the size and shape of the user's body by measuring the expansion in the measuring sensor based upon a change in a characteristic (in particular, an electrical characteristic) other than the electric resistance value.

Second Embodiment

Outline of Second Embodiment

In the above-mentioned first embodiment, the control part 31 of the managing server 30 outputs the user size information based upon the coordinate information of the nodes of the size measuring device 10.

On the other hand, in a size measuring system in accordance with a second embodiment of the present invention, in addition to the coordinate information of the nodes, by using a human body model that three-dimensionally represents the human body surface by coordinate information, the body type and body size of the user are three-dimensionally reproduced, and based upon this, the user size information is outputted.

The following description will explain the present embodiment on the assumption that the same configuration and operations as those of the first embodiment are used, unless otherwise specified.

Configuration of Second Embodiment (1) Configuration of Measuring Sensor 30

(Storage of Model Information and Altering Function)

In the information storage part 32 of the managing server 30 in the present embodiment, model information indicating a human body model for use in three-dimensionally reproducing the body type of the user is stored.

The model information corresponds to data for use in three-dimensionally reproducing the surface shape of a standard human body in a three-dimensional virtual space, and the control part 31 of the managing server 30 can form the human body model based upon the corresponding data.

The model information is, for example, surface shape data obtained by polygonal data, CAD data or a three-dimensional camera, etc., and coordinate information, such as points, polygons or the like on the surface of the human body is also included therein.

Moreover, on the human body model, nodes are disposed in the same manner as in the size measuring device 10 of a garment type, and coordinate information of the respective nodes is included in the model information.

The respective nodes on the human body model are made associated with the positions of nodes located on the human body model when the corresponding human body model hypothetically wears the size measuring device 10.

Therefore, the respective nodes in the model information and the respective nodes of the size measuring device 10 are made associated with each other in one-to-one relation.

After generation of the coordinate information of the nodes of the size measuring device 10, the control part 31 alters the coordinate information of the nodes of the human body model, based upon the coordinate information of the nodes of the corresponding size measuring device 10.

For example, when a user having a waist size larger than the standard waist indicated by the human body model wears the size measuring device 10, the nodes disposed on the waist of the human body model have their coordinate information altered so as to be moved outward of the body.

In this manner, when the control part 31 alters the coordinates of the nodes disposed on the surface of the human body model, a distance between the corresponding node and another node adjacent to the node is also enlarged or reduced.

At this time, the control part 31 alters the surface shape between the nodes in the human body model by interpolating the shapes of the surfaces of the human body model between the corresponding nodes in a manner so as to smoothly connect the nodes adjacent to each other.

The altering method of the surface between the nodes, a conventionally known curve model, such as a spline curve, may be used; however, the present invention is not intended to be limited by this.

As described above, the body type of the human body model indicated by the model information is altered so as to become closer to the body type and size of the user in question.

The control part 31 stores the coordinate information of the nodes of the human body model after the alteration and the coordinate information of the surface between the nodes in the information storage part 32 as model information after the alteration.

(Generation Function of Slice Data)

After the control part 31 has carried out the alteration of the model information based upon the measurement results of the size measuring device 10 as described above, it generates slice data indicating cross sections in parallel with one another, which are formed by slicing the human body model after the alteration into thin layers along a predetermined direction.

The slice data is generated for each of the cross sections.

The slice data includes coordinate information of a cut surface that is a face through which the human body model is cut upon generating the cross section of the human body model and information of figure appearing in the cross section.

For example, when the human body model is cut along the circumference of the waist of the human body model, a ring-shaped figure indicating the circumference of the waist appears on the cross section.

The slice data generated upon cutting along the circumference of the waist includes coordinate information of the cut surface and coordinate information of the ring-shaped figure indicating the circumference of the waist.

(Generation Function of User Size Information)

The control part 31 analyzes the figure indicating the cross section of the human body model shown by the slice data, and generates user size information.

For example, as described above, in the case when the slice data includes the coordinate information of the ring-shaped figure indicating the circumference of the waist, the control part 31 outputs the circumferential length of the ring-shaped figure based upon the coordinate information of the figure, and registers the length as the waist size of the user size information in the user measurement DB325.

Moreover, in the same manner as in the first embodiment, in the present embodiment also, a program in which a generation algorithm for the user size information is described is stored in the information storage part 32.

In the generation algorithm of the user size information, positional information of cut surfaces for use in generating slice data is described.

The positional information of cut surfaces corresponds to information indicating which position of the human body model should be cut through a cut surface.

The control part 31 reads out the above-mentioned program, and by using the generation algorithm of the user size information, generates slice data from the human body model after the alteration, and then generates the user size information based upon the positional information of the cut surfaces, and the number, shape or size, etc. of figures indicated by the slice data.

(Specific Examples of Generation Function of Slice Data and User Size Information)

Next, the following description will explain specific examples of generation functions of slice data and user size information with the managing server 30.

Additionally, the position of the cut surface of the slice data shown below is exemplary only, and the position may be set at an arbitrary position.

Figure 26:
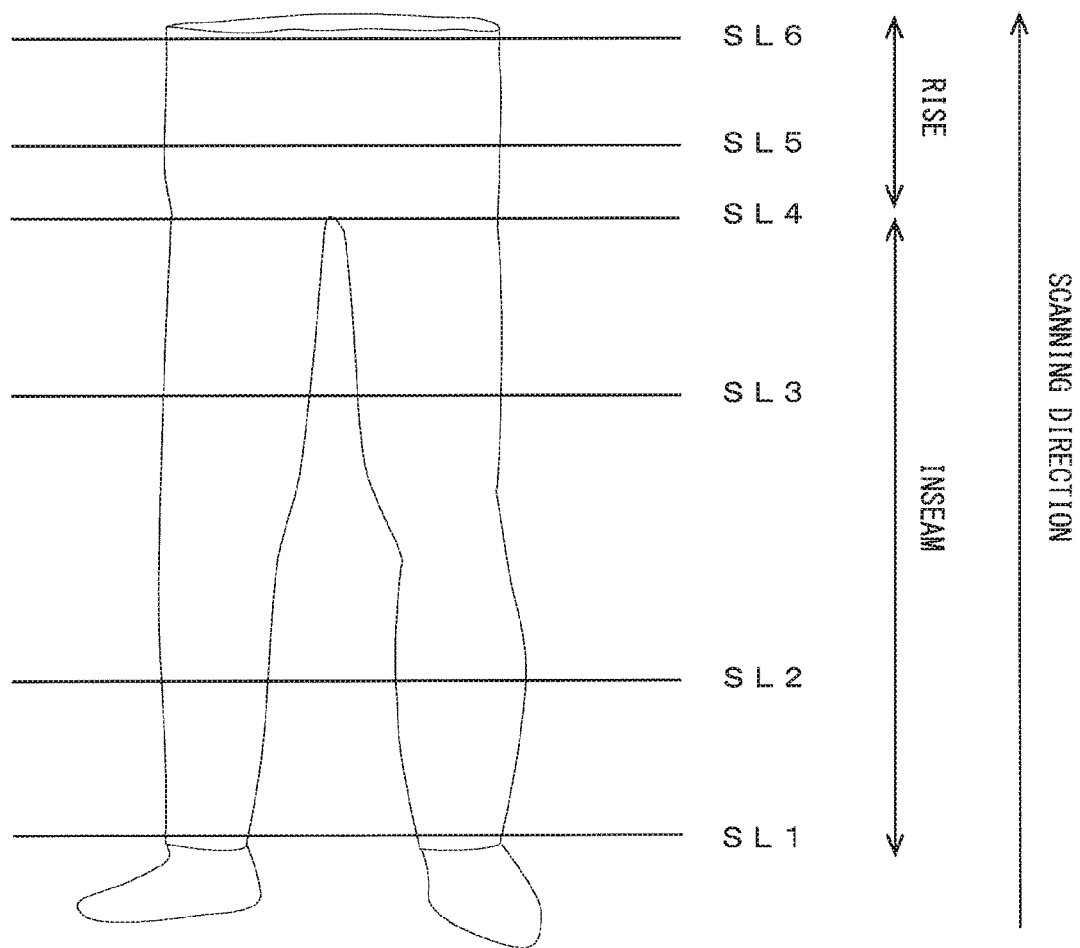
FIG. 26 is a view showing one example in which a human body model after an alteration in a second embodiment of the present invention is represented by a three-dimensional image.

FIG. 26 is a view showing one example in which a human body model after an alteration in the second embodiment of the present invention is represented by a three-dimensional image.

In the example of the drawing, the lower body portion of the human body model is represented, and a scanning process is carried out in a direction from the ankle side toward the waist side, and the lower body portion of a user is hypothetically cut along cut surfaces SL1 to SL6 that are orthogonal to the scanning direction so that slice data indicating cross-sectional images of the lower body portion is generated.

Figure 27:
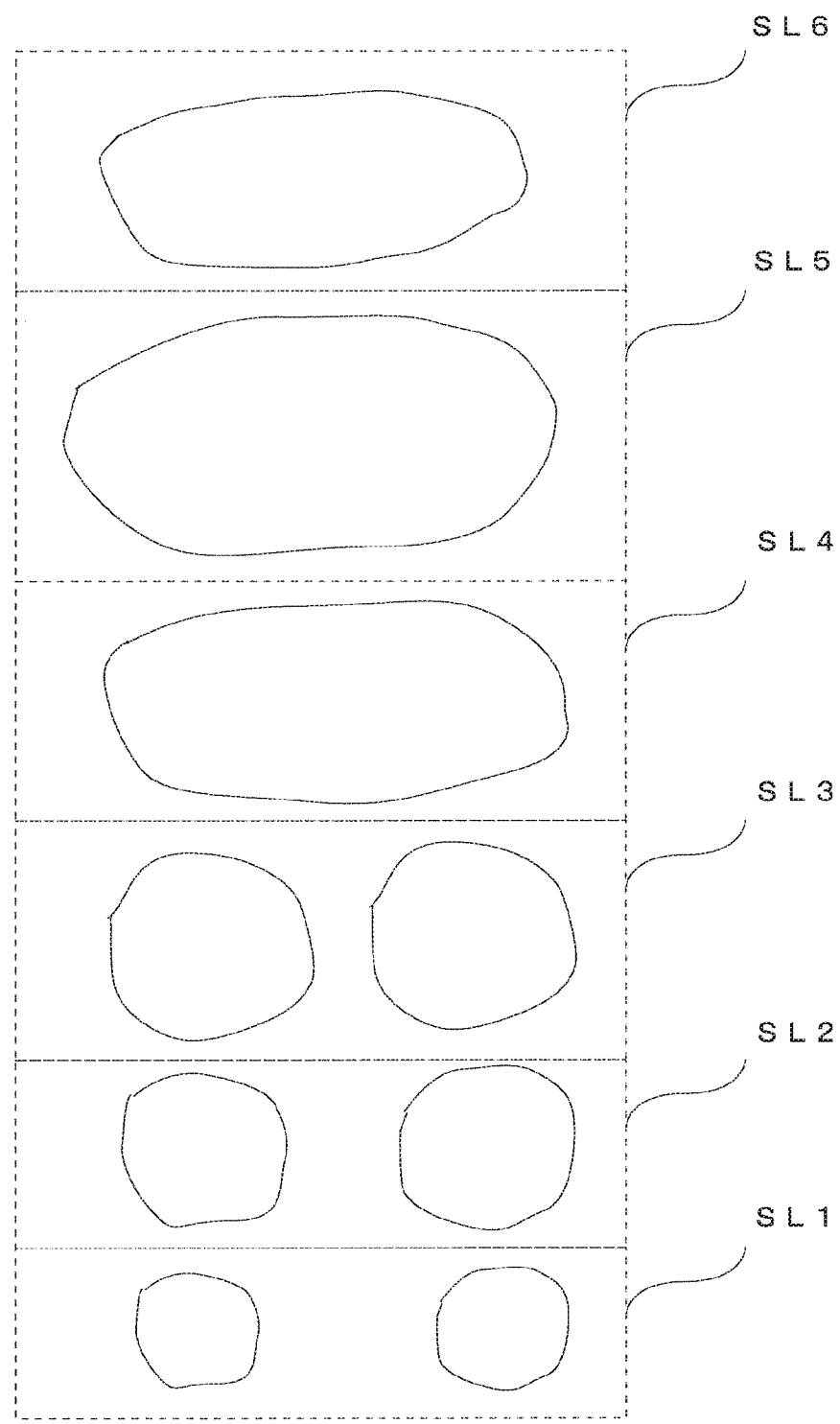
FIG. 27 is a view showing one example of slice data in accordance with the second embodiment of the present invention.

FIG. 27 is a view showing one example of slice data in accordance with the second embodiment of the present invention.

FIG. 27 shows respective cross sections that are respectively cut along SL1 to SL6 of FIG. 26.

In the present embodiment, by scanning the three dimensional shape of the user's body indicated by the body shape information in a predetermined direction, the control part 31 determines the positions of the cut surfaces based upon the figure shown by the cross section and the contents described in the generation algorithm of the user size information stored in the information storage part 32.

In the example of FIG. 26, the scanning process is carried out from the ankle toward the waist in a direction shown by an arrow, and cross sections of the three-dimensional shape of the user's lower body are extracted at predetermined intervals, and based upon the number of figures on the cross sections, sizes or the like, the positions of the cut surfaces SL1 to SL6 are determined.

In the example of FIG. 26, when the scanning is started from the ankle, first, two ring-shaped figures indicating cross sections of the two legs appear, and as the scanning continues, as it is, one ring-shaped figure comes to appear about the base of the two legs.

Additionally, with respect to the technique for extracting cross sections from a three-dimensional shape, known techniques may be used.

Additionally, in the generation algorithm of the user size information, positional information of the cut surfaces SL1 to SL6 is described as described below.

The cut surface SL1 corresponds to a position at which the two ring-shaped figures are generated and as the scanning process proceeds from the ankle in the waist direction, each of the diameters of the ring-shaped figures becomes smallest (or the length of the circumference becomes shortest) to form a first peak, and this position actually corresponds to the position of the user's ankle.

The cut surface SL2 corresponds to a position at which the two ring-shaped figures are generated and as the scanning process proceeds from the ankle in the waist direction, each of the diameters of the ring-shaped figures becomes largest (or the length of the circumference becomes largest) to form a first peak, and this position actually corresponds to the position of the user's calf.

The cut surface SL3 corresponds to a position at which the two ring-shaped figures are generated and as the scanning process proceeds from the ankle in the waist direction, each of the diameters of the ring-shaped figures becomes larger (or the length of the circumference becomes larger) to form a second peak, and this position actually corresponds to the position of the user's thigh.

The cut surface SL4 corresponds to a position at which as the scanning process proceeds from the ankle in the waist direction, the two ring-shaped figures generated above are switched to a single figure, and this position actually corresponds to the upper end of the user's inseam.

The cut surface SL5 corresponds to a position at which one ring-shaped figure is generated and as the scanning process proceeds from the ankle in the waist direction, the diameter of the ring-shaped figure becomes larger (or the length of the circumference becomes larger) to form a first peak, and this position actually corresponds to the hips of the user.

The cut surface SL6 corresponds to a position at which one ring-shaped figure is generated and as the scanning process proceeds from the ankle in the waist direction, the diameter of the ring-shaped figure becomes smaller (or the length of the circumference becomes shorter) to form a first peak, and this position actually corresponds to the upper's waist.

Moreover, as the cut surface SL6, a position at which as the scanning process proceeds from the ankle in the waist direction, the ring-shaped figure becomes the smallest after the above-mentioned cut surface SL5 (hips) (or the length of the circumference becomes the shortest) may be set.

The control part 31 of the managing server 30 reads out positional information of the cut surfaces for generating the above-mentioned slice data from the generation algorithm of the user size information, and based upon the positional information of the corresponding cut surface, generates slice data from the body shape information.

The slice data also include coordinate information of the scanning direction (length direction of legs) of the cut surface in addition to figure data of the ring-shaped figure generated at the time of the cutting process through each cut surface.

In the present example, in the case when the human body model is disposed in a stand-up state and the scanning process is carried out on the lower body, the control part 31 scans the human body model vertically from bottom to top, and the positions of the cut surfaces SL1 to SL6 are successively determined based upon the positional information of the cut surface.

In this case, the slice data generated for each cut surface include information of the figure (ring-shaped figure) of the cut surface and the coordinate information in the height direction of the cut surface, as described above.

The control part 31 generates user size information based upon the length of the circumference of the ring-shaped figure indicated by the generated slice data and the position in the scanning direction (length direction of legs).

For example, in the case of the size of the waist in the user size information, the control part 31 can generate the size by measuring the length of the circumference of the ring-shaped figure indicated by the above-mentioned cut surface SL6.

Moreover, in the case of the thickness of the ankle, thickness of the calf, the thickness of the thigh and size of hip in the user size information, the control part 31 can generate the sizes by respectively measuring the circumference of each of the ring-shaped figures indicated by the slice data generated by the cutting process through each of the cut surfaces SL1, SL2, SL3 and SL5.

Moreover, with respect to the user size information for the size in the vertical direction (length direction of legs), such as the inseam or the like, the information is generated in the following manner.

The control part 31 calculates the length from the ankle (lower end of legs) of the user to the upper end of the inseam, based upon the coordinates in the scanning direction of the cut surface SL1 and the coordinates in the scanning direction of the cut surface SL4, and generates the length thus calculated as the user size information of the length of the inseam.

In the same manner, with respect to the length of the inseam, the user size information is generated based upon the coordinates in the scanning direction of the cut surface SL4 and the coordinates in the scanning direction of the cut surface SL6.

In this manner, with respect to the length in the scanning direction, the corresponding length is generated based upon coordinate information in the scanning direction of the cut surfaces.

The control part 31 carries out processes (supply of commodity retrieval results information and supply of virtual fitting image, etc.) after the generation of the user size information as described above in the same manner as in the first embodiment; therefore, the explanation thereof will be omitted.

As described above, in the present embodiment, for example, in the generation algorithm of the user size information, the cut surfaces SL1 to SL6 are set to the respective positions corresponding to the ankle, calf, thigh, upper end of inseam, hips and waist of the user, and described therein.

These are exemplary only, and depending on a portion among the respective body portions of the user to be desirably measured, the position of the cut surface may be desirably set.

For example, various body portions, such as fingers, wrist, breasts, width of the shoulder or the like, may be selected as a measuring object, and in accordance with the position of the body portion to be desirably measured, the position of a cut surface may be set in the generation algorithm, and described therein.

In the present embodiment, the position of the cut surface is determined based upon the number and the size of figures that appear on the cross section of the human body model; however, the position may be determined based upon the shape, position and other elements of the figures.

Moreover, with respect to the size of the figures, the control part 31 relatively compares sizes between the figures appearing on different cross sections, and determines the position of the cut surface based upon the results of the comparison; however, this may be determined by comparing the size of the figure and the numeric value preliminarily described in the algorithm, and based upon the results of the comparison.

Furthermore, the direction in which the human body model is scanned is not intended to be limited by the example of the present embodiment.

[3] Operations of Second Embodiment

Next, the following description will explain measuring operations of the size or the like of a body of a user with the size measuring system in accordance with the second embodiment of the present invention.

Figure 28:
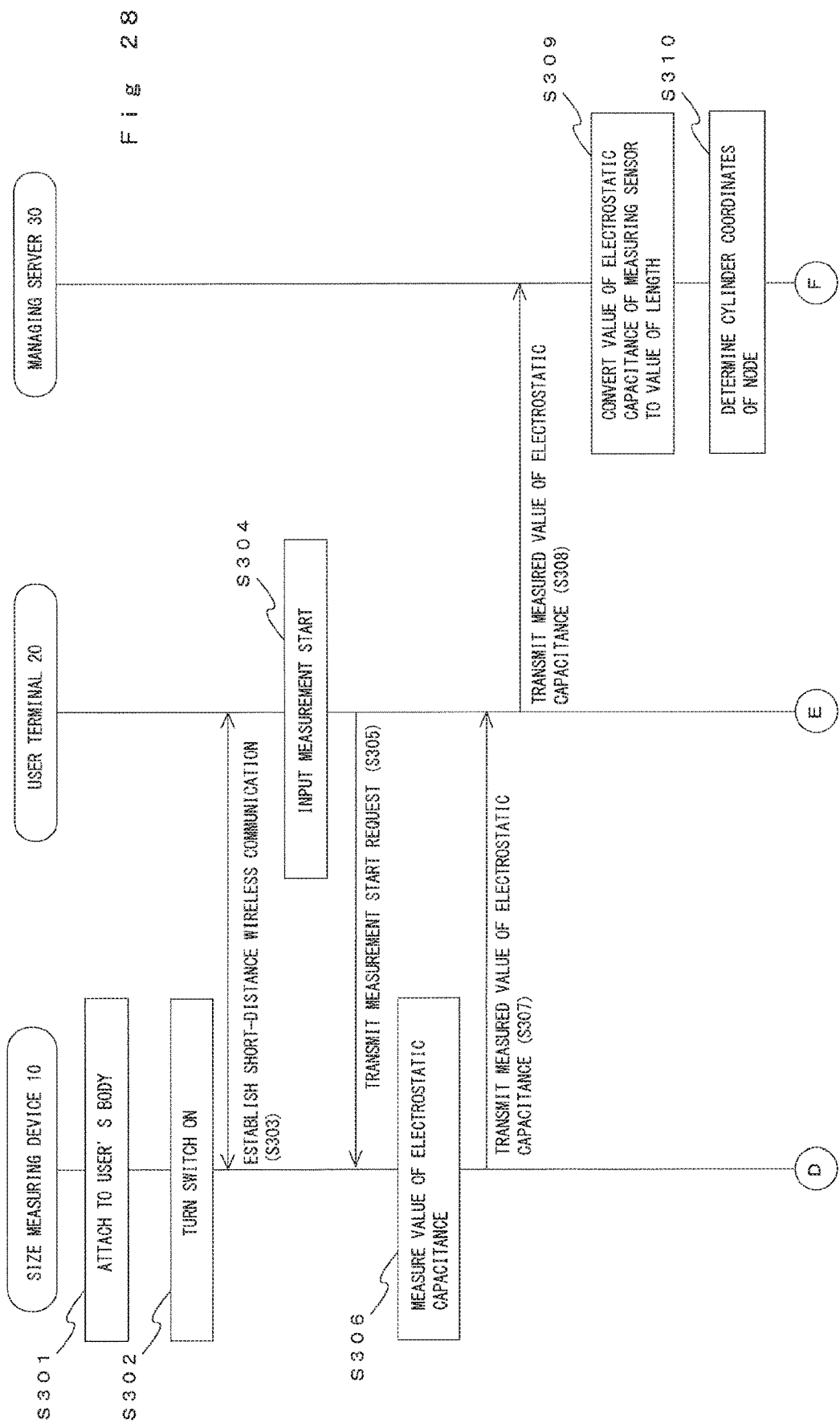
FIG. 28 is a sequence chart showing a flow of measuring operations of a size or the like of the body of a user with a size measuring system in accordance with the second embodiment of the present invention.
Figure 29:
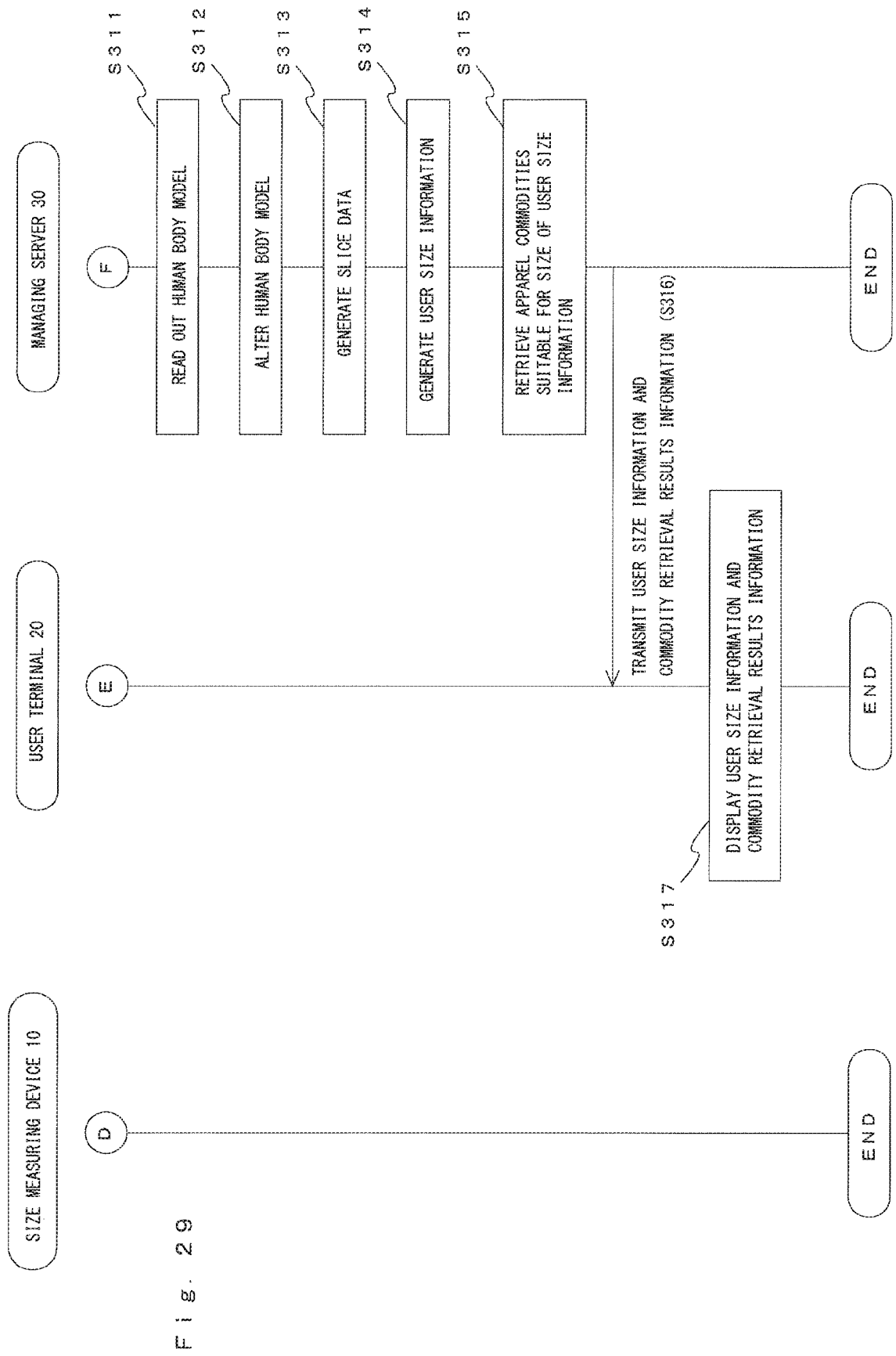
FIG. 29 is another sequence chart showing a flow of measuring operations of a size or the like of the body of a user with the size measuring system in accordance with the second embodiment of the present invention.

FIG. 28 and FIG. 29 show a sequence chart indicating the flow of measuring operations of the size or the like of the user's body with the size measuring system in accordance with the second embodiment of the present invention.

Referring to the drawings, explanations will be given on the measuring operations.

Since the operations of steps S301 to S310 in the present embodiment are the same as those of steps S101 to S110 in the first embodiment, the description thereof will be omitted.

When the control part 31 of the managing server 30 has determined the cylinder coordinates of each of the nodes of the size measuring device 10, it reads out the human body model from the information storage part 32 (step S311).

Next, based upon the cylinder coordinates of each of the nodes in the size measuring device 10, the control part 31 alters the position of each of the nodes of the human body model, and carries out the altering processes on the entire shape of the human body model (step S312).

Next, by using the generation algorithm of the user size information, the control part 31 cuts the human body model having a three-dimensional shape after the alteration, and generates slice data corresponding information about its cross section (step S313).

Next, by using the generation algorithm of the user size information, the control part 31 generates user size information based upon the above-mentioned slice data (step S314).

The control part 31 registers the corresponding generated user size information in the user measurement DB325.

Since subsequent operations (steps S315 to S317) are the same as those of steps S112 to S114 in the first embodiment, the description thereof will be omitted.

[4] Summary of Second Embodiment

As described above, in accordance with the size measuring system in the second embodiment of the present invention, since the managing server 30 generates user size information based upon the model information that three-dimensionally represents a standard body type of a human body in addition to coordinate information of the nodes of the size measuring device 10, the user is allowed to obtain information of his or her body type and size, with higher precision, and can confirm the size and body type of his or her body, and also easily retrieve apparel commodities that fit to the size and body type of his or her body.

<Summary of Embodiments>

As explained above, in accordance with the size measuring system in the first embodiment of the present invention, by a simple operation such as to wear the size measuring device 10 on his or her body as if, for example, putting on tights or a shirt, the user can specify the size and shape of the body based upon the value of electrical characteristics (electrostatic capacitance, resistance value, or the like) of the measuring sensor or a change in the value, and easily retrieve any apparel commodity that fits to the body.

The above-mentioned size measuring device 10, user terminal 20 and managing server 30 can be realized mainly by a program loaded in a CPU and a memory. However, this device or server may be constituted by an arbitrary combination between hardware and software other than this combination, and its high degree of freedom in designing can be easily understood by the person skilled in the art.

Moreover, in the case when the above-mentioned size measuring device 10, the user terminal 20 or the managing server 30 is configured as a group of software modules, the corresponding program may be recorded on a recording medium such as an optical recording medium, a magnetic recording medium, a magneto-optical recording medium or a semiconductor, etc., and may be loaded from the above-mentioned recording medium, or may be loaded from an external apparatus connected thereto through a predetermined network.

Additionally, the above-mentioned embodiments show one example of a desired embodiment of the present invention; however, the present invention is not intended to be limited by the above-mentioned embodiments, and various modifications may be made therein within a scope not departing from the gist of the invention.

For example, the measuring sensor of the first embodiment specifies the shape and size of the body of a user based upon the electrostatic capacitance, and the measuring sensor of the modified example 3 of the first embodiment specifies them based upon the resistance value; however, these may be specified by using a change in another electrical characteristic.

Moreover, with respect to the configuration for measuring the electrostatic capacitance or resistance value by the measuring sensor, various known techniques not described in the present specification may be applied thereto.

Moreover, in the above-mentioned embodiments, the measurement is started when the user operates the user terminal 20; however, the measurement may be designed to be started by allowing the user to operate a predetermined switch or the like installed in the size measuring device 10.

Furthermore, in the above-mentioned embodiment, the managing server 30 receives sensor measurement information from the size measuring device 10 through the user terminal 20; however, the information may be designed to be directly received from the size measuring device 10 through a wired/wireless communication network (for example, Wi-Fi, Internet or 3G line or the like) without using the user terminal 20.

Furthermore, with respect to the respective embodiments (including modified examples) as explained above, any combination may be made as appropriate even if the combination is not directly described therein, and the combination thus made is included in the present embodiments.

EXPLANATION OF REFERENCE NUMERALS 1 main body part
4 measurement processing part
10 size measuring device
11, 21, 31 control part
12, 22, 32 information storage part
13, 23, 33 communication part
14 detection part
15 measuring part
20 user terminal
24 display part
25 operation part
30 managing server
321 sensor measurement DB
322 measurement conversion DB
325 user measurement DB
326 commodity DB
327 body type image DB
328 commodity image DB
1200, Sa to Sl, Sc1 to Sc13 measuring sensor
1201 dielectric film
1202, 1203 electrode
C101, C102 circle
Na to Nl, Nd1 to Nd4, Nd101, Nd102 node
Rg0 to Rg3 ring unit

The invention claimed is:

1. A size measuring system which specifies a size and shape of a body portion of a user, comprising:
   a wearable member including:
      a main body part constituted by an expandable material;
      a plurality of measuring sensors disposed on the main body part for measuring a physical numeric value based upon a change in an electrical characteristic, each of the plurality of measuring sensors comprising a belt shape, one or more ring units, including at least one reference ring unit, formed of multiple connected measuring sensors wherein connection points among the plurality of measuring sensors define plural nodes, the one or more ring units forming one or more cylinder models representative of a human body model of at least a portion of a user's body; and
      wherein the plurality of measuring sensors measures a degree of expansion of a section of the main body part caused by the shape of a user's body, and the plurality of measuring sensors are disposed on the main body part in a polygonal pattern;
   a managing server for acquiring data of values of electrical characteristics from the plurality of measuring sensors, wherein the managing server converts the acquired data of values in electrical characteristics into data indicating physical numeric values of the plurality of measuring sensors, and based upon the converted physical numeric values, determines relative positions among the plural nodes; and
   wherein the managing server is configured to (i) based upon physical numeric values determine cylinder coordinates of nodes forming the reference ring unit and (ii) determine cylinder coordinates of one or more ring units adjacent to the reference ring unit based on physical numeric values and cylinder coordinates of the nodes forming the reference ring unit.

2. The size measuring system according to claim 1, further comprising:
   a detection part for detecting a value in the electrical characteristic outputted from the plurality of measuring sensors,
   wherein the detection part detects the value in the electrical characteristic of the plurality of measuring sensors based upon an electric signal outputted from the plurality of measuring sensors.

3. The size measuring system according to claim 1 or 2, wherein the plurality of measuring sensors each have a pair of plate-shaped electrodes and a dielectric film disposed between the paired electrodes, wherein when a tension is applied to the electrodes so as to be expanded, the plurality of measuring sensors specify the degree of expansion of the electrodes caused by the shape of a user's body based upon a change in electrostatic capacitance caused by the expansion of the electrodes.

4. The size measuring system according to claim 1, wherein the plurality of measuring sensors each have plate-shaped electrodes having expandability, and when a tension is applied to the electrodes so as to be expanded, the plurality of measuring sensors specify the degree of expansion of the electrodes caused by the shape of a user's body based upon a change in electric resistance value caused by the expansion of the electrodes.

5. The size measuring system of claim 1, wherein information indicating the size or shape of body portions of the user is determined based upon the relative positions among the plural nodes thus determined, and the resulting information indicating the size or shape of body portions of the user thus determined is transmitted to a user terminal to be operated by the user.

6. The size measuring system according to claim 5, wherein based upon the relative positions among the plural nodes thus determined, the human body model, being a three-dimensional of the human body surface, is deformed, and based upon the size information indicated by cross-sectional data of the deformed human body model, information indicating the size or shape of body portions of the user is generated.

7. The size measuring system according to claim 5 or 6, further comprising:
   a database for managing the size and shape of apparel commodities,
   wherein after converting to data indicating physical numeric values, the managing server refers to the database, and retrieves the apparel commodities that are coincident with the data indicating the physical numeric values so as to transmit the retrieval results to the user terminal.

8. The size measuring system according to claim 5 or 6 for storing human body images having a plurality kinds of body types and commodity images having a plurality of kinds that fit to the body types, and for determining the body type of a user based upon information indicating the size or shape of a body portion of the user,
   wherein by extracting a commodity image that fits to the determined body type, and by extracting a human body image that fits to the body type or deforming the image so as to fit thereto, the extracted or deformed human body image is composed with the extracted commodity image so that a virtual fitting image indicating a human body image wearing the commodity image is generated and the virtual fitting image thus generated is transmitted to the user terminal.

9. The size measuring system of claim 1 or 2, further comprising a user terminal for acquiring data of values of electrical characteristics of the plurality of measuring sensors outputted for converting the acquired data of values in electrical characteristics into data indicating physical numeric values of the plurality of measuring sensors, wherein based upon the converted physical numeric values, the user terminal determines relative positions among the plural nodes, and based upon the relative positions among the plural nodes thus determined, the user terminal also determines information indicating the size or shape of body portions of the user and outputs the information indicating the size or shape of body portions of the user thus determined.

10. The size measuring system according to claim 9, wherein the user terminal transmits information indicating the size or shape of a body portion of the user thus determined to a managing server, and receives retrieval results of apparel commodities that are coincident with the size or shape of the body portion of the user generated by the managing server from the managing server, and then outputs the retrieval results.

11. The size measuring system according to claim 10, wherein the user terminal, based upon information indicating the size or shape of a body portion of the user, determines the body type of the user, and transmits an acquisition request for a commodity image and a human body image that fit to the determined body type to the managing server,
   wherein upon receipt of the commodity image and the human body image from the managing server, the user terminal combines the received body image and commodity image with each other to generate a virtual fitting image indicating a human body image wearing the commodity image and outputs the virtual fitting image thus generated.

12. The size measuring system according to claim 1, wherein based upon the relative positions among the plural nodes thus determined, the managing server deforms the human body model, and based upon the size information indicated by cross-sectional data of the deformed human body model, generates information indicating the size or shape of body portions of the user.

13. The size measuring system according to claim 12, wherein the managing server is provided with database for managing the size and shape of apparel commodities, and
   wherein after converting to data indicating physical numeric values, the managing server refers to the database, and retrieves apparel commodities that are coincident with the data indicating the physical numeric values so as to transmit the retrieval results to a user terminal.

14. The size measuring system according to claim 13, wherein the managing server transmits information including a URL of a Web page for use in purchasing apparel commodities to the user terminal as commodity retrieval result information indicating the retrieval results for the apparel commodities, and the user terminal acquires the Web page for use in purchasing the apparel commodities by using the information including the URL.

15. The size measuring system according to any one of claims 12 to 14, wherein the managing server stores human body images having a plurality of kinds of body types and commodity images having a plurality of kinds that fit to the body types, and determines the body type of a user based upon information indicating the size or shape of a body portion of the user, and by extracting a commodity image that fits to the determined body type, and by extracting a human body image that fits to the body type or deforming the image so as to fit thereto, generates a virtual fitting image indicating a human body image wearing the commodity image by composing the extracted or deformed human body image with the extracted commodity image so that the virtual fitting image thus generated is transmitted to the user terminal.

* * * * *